US009134874B2

(12) United States Patent
Ahuja et al.

(10) Patent No.: US 9,134,874 B2
(45) Date of Patent: Sep. 15, 2015

(54) MEDIA PLAYER USER INTERFACE SYSTEMS AND METHODS

(71) Applicant: Verizon Patent and Licensing Inc., Arlington, VA (US)

(72) Inventors: Sanjay Ahuja, Irving, TX (US); Donald H. Relyea, Dallas, TX (US); Andrew Allman, Dallas, TX (US); George M. Higa, Plano, TX (US); Laxmi A. Arte, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 361 days.

(21) Appl. No.: 13/664,389

(22) Filed: Oct. 30, 2012

(65) Prior Publication Data

US 2014/0123011 A1      May 1, 2014

(51) Int. Cl.
*G06F 3/048* (2013.01)
(52) U.S. Cl.
CPC ...................... *G06F 3/048* (2013.01)
(58) Field of Classification Search
CPC ...................................................... G06F 3/0481
USPC ........................................ 715/721; 725/37–61
See application file for complete search history.

(56) References Cited

U.S. PATENT DOCUMENTS

| | | | | |
|---|---|---|---|---|
| 6,151,059 A | * | 11/2000 | Schein et al. | 725/37 |
| 6,177,931 B1 | * | 1/2001 | Alexander et al. | 725/52 |
| 6,425,129 B1 | * | 7/2002 | Sciammarella et al. | 725/38 |
| 8,671,359 B2 | * | 3/2014 | Koizumi et al. | 715/786 |
| 2003/0126605 A1 | * | 7/2003 | Betz et al. | 725/39 |
| 2007/0022450 A1 | * | 1/2007 | Kim et al. | 725/86 |
| 2010/0083316 A1 | * | 4/2010 | Togashi et al. | 725/41 |
| 2011/0239253 A1 | * | 9/2011 | West et al. | 725/46 |
| 2012/0099029 A1 | * | 4/2012 | Nejat et al. | 348/840 |
| 2012/0210356 A1 | * | 8/2012 | Kiok et al. | 725/39 |
| 2013/0191776 A1 | * | 7/2013 | Harris et al. | 715/784 |

* cited by examiner

*Primary Examiner* — Matthew Ell

(57) ABSTRACT

An exemplary method includes a media player user interface system 1) displaying a GUI on a display screen associated with a computing device, the GUI including a user-scrollable media content menu that contains a display area associated with a media feed accessible by the computing device, 2) selecting menu display content for the display area based at least in part on a scroll status of the user-scrollable media content menu, 2) and populating the display area with the selected menu display content. Corresponding methods and systems are also disclosed.

15 Claims, 21 Drawing Sheets

MEDIA PLAYER USER INTERFACE SYSTEMS AND METHODS

BACKGROUND INFORMATION

Advances in computing technologies have provided users of computing devices with access to a variety of computing tools. To illustrate, improved specifications and increased capabilities of computing devices such as mobile smart phones and tablet computers have allowed users of the devices to access and consume media programs from various sources and in a variety of formats.

Such advances in computing technologies have challenged designers of user interfaces for computing devices such as mobile smart phones and tablet computers. A common challenge has been to design and implement user interfaces that provide an appropriate balance of information, usability, intuitiveness, control, and functionality that promotes a quality user experience. While user interface technologies have made significant advances in this regard, there remains room for improvement. For instance, there remains room to improve the intuitiveness, convenience, and/or usability of user interfaces that are designed to be used by a user of a mobile computing device to navigate menus and access and experience media programs.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
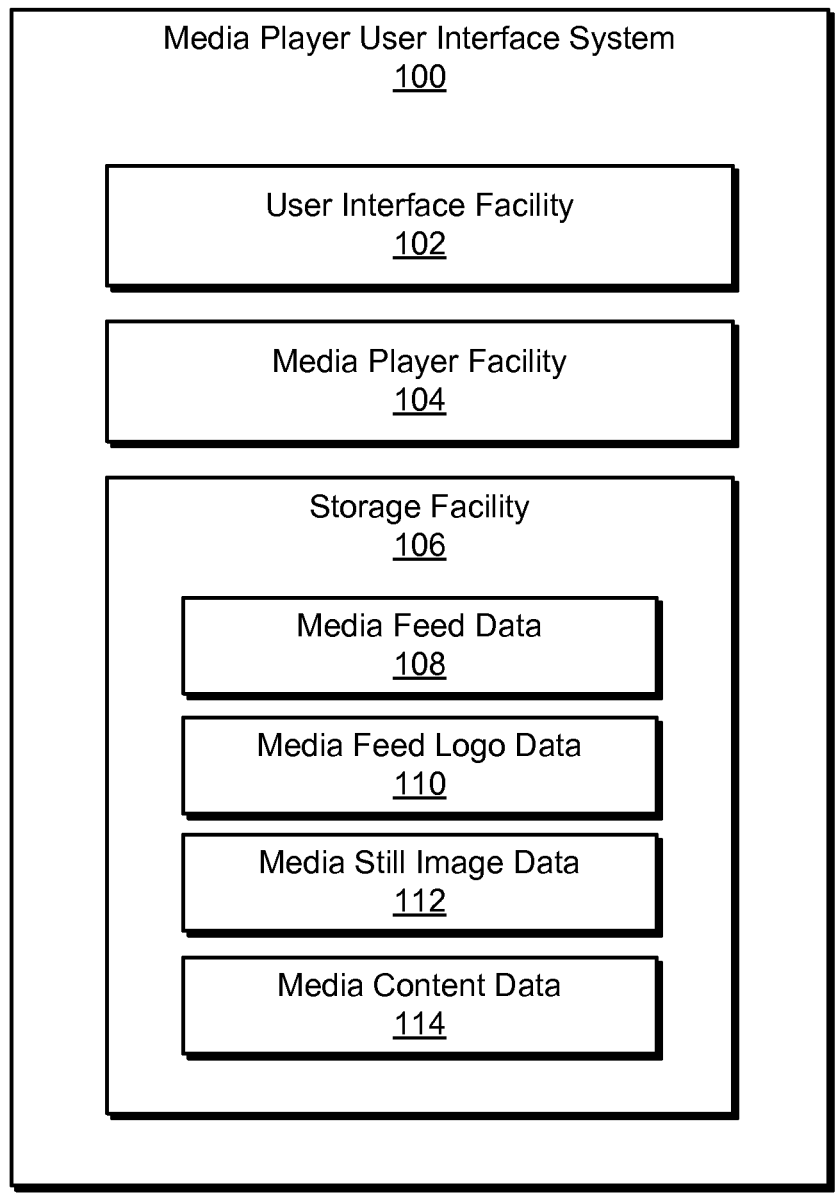
FIG. 1 illustrates an exemplary media player user interface system according to principles described herein.

Exemplary media player user interface systems and methods are described herein. The exemplary systems and methods described herein may provide a user interface configured to facilitate a user interacting with a computing device (e.g., a mobile computing device such as a tablet computer and/or a smartphone) to find, access, and experience media content. For example, the exemplary systems and methods described herein may provide a graphical user interface ("GUI") that includes a navigable menu of media content and one or more user interface elements configured to facilitate convenient, intuitive, and/or user-friendly navigation of the menu of media content. For example, in conjunction with a display and/or a navigation of the menu of media content, the exemplary systems and methods described herein may select and present menu display content based at least in part on a navigation status associated with the menu (e.g., a scroll status of a user-scrollable media content menu) in a way that may facilitate convenient, intuitive, and/or user-friendly navigation of the menu of media content and/or experiencing of media content.

As an example, a media player user interface system may display a GUI on a display screen associated with a computing device. The GUI may include a user-scrollable media content menu that contains a display area associated with a media feed accessible by the computing device. The media player user interface system may select menu display content for the display area based at least in part on a scroll status of the user-scrollable media content menu and populate the display area with the selected menu display content.

In certain examples, the media player user interface system may be configured to select and present a particular type of menu display content for a particular scroll status. For example, the media player user interface system may be configured to select and present a media feed logo image or a still image of a video program associated with the media feed when the scroll status of the user-scrollable menu section is non-stationary (e.g., when the menu is scrolling). The media player user interface system may be further configured to select and present (e.g., play back) the video program associated with the media feed when the scroll status of the user-scrollable menu section is stationary (e.g., when the menu has stopped scrolling and is stationary for a predefined length of time).

As used herein, the term "media feed" may refer to a stream of media content and/or an address for the stream of media content accessible by a computing device from a particular source and/or media carrier. For example, a media feed may include a stream of media content that is accessible by a computing device from a media streaming server. The stream of media content may include a streaming audio program, video program, and/or other media programs, such as movies and/or television programs. In certain examples, the media programs may include Internet-streamed live television programs that are transmitted on particular programming channels at particular times in accordance with a transmission schedule (e.g., a live television transmission schedule).

Examples of media player user interface systems and methods, as well as examples of GUIs and GUI views provided by the systems and methods will now be described in reference to the accompanying drawings.

FIG. 1 illustrates an exemplary media player user interface system 100 ("system 100"). As shown, system 100 may include, without limitation, a user interface facility 102, a media player facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Facilities 102-106 of system 100 may include or be implemented by one or more computing devices. Exemplary implementations of system 100 are described in more detail herein.

Storage facility 106 may be configured to store data generated and/or used by user interface facility 102 and/or media player facility 104. For example, storage facility 106 may store media feed data 108 representative of one or more available media feeds. Media feed data 108 representative of one or more available media feeds may include any information related to the media feeds. For example, media feed data 108 may include addresses of media streams, channel identifiers for programming channels (e.g., channel names and/or numbers, such as a programming channel known as "The History Channel" and/or an assigned channel number "88"), media program identifiers for media programs associated with the media feeds (e.g., titles of media programs accessible on programming channels), and/or any additional or alternative information configured to be used by media player facility 104 to access the media feeds, which access may include requesting and receiving a stream of media content from a media streaming server.

Storage facility 106 may further store media feed logo data 110 representative of media feed logo images (e.g., channel logo images) for the media feeds represented by media feed data 108, media still image data 112 representative of still images of media programs associated with one or more of the media feeds (e.g., select frames of the media programs), and media content data 114 representative of the media programs associated with the media feeds (e.g., the media programs carried on the media feeds). Storage facility 106 may store additional or alternative data as may serve a particular implementation.

User interface facility 102 may be configured to provide a user interface through which a user of a computing device may interact with the computing device to find, access, and experience media content. In certain examples, the user interface may include one or more menus of media content configured to be navigated by the user to find and initiate presentation of media content. For example, a user-scrollable menu may be included in a GUI such that a user may provide input to scroll through available media content options. Additionally or alternatively, in certain examples, the GUI may be configured to concurrently display playback of multiple video programs for viewing by a user. One or more of the concurrently displayed video programs may be displayed as part of a scrollable menu of media content in the GUI. For example, a user-scrollable menu of media content may be included in the GUI and may include one or more display areas within which video may be selectively played back as described herein.

Figure 2:
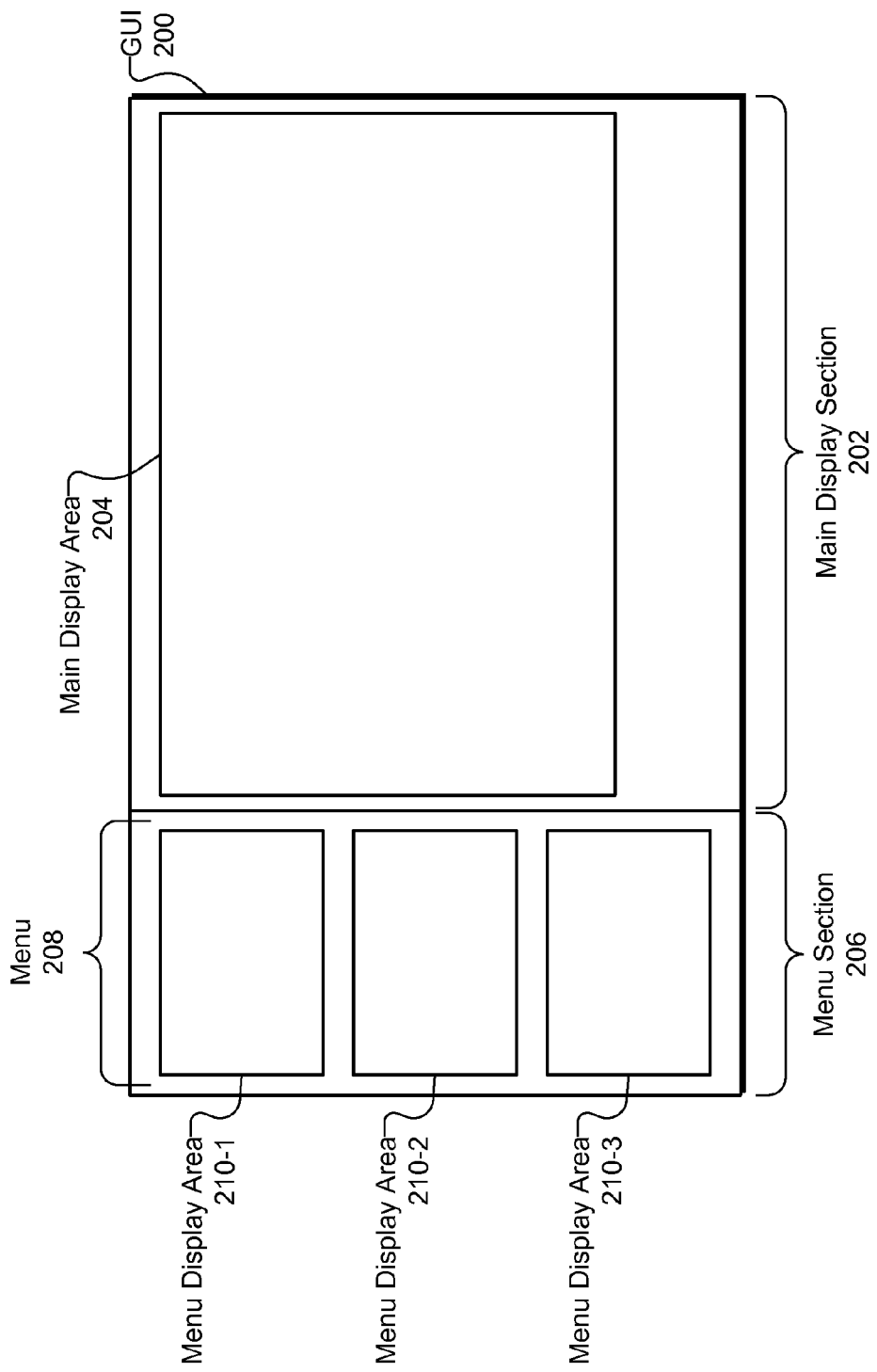
FIG. 2 illustrates an exemplary graphical user interface according to principles described herein.

FIG. 2 illustrates an exemplary GUI 200 that may be provided by user interface facility 102 for display on a display screen associated with a computing device. GUI 200 may include a main display section 202 having a main display area 204 within which a playback of a video program selected as a "primary display" video program may be displayed. GUI 200 may also include a menu section 206 within which elements of a user-scrollable media content menu 208 ("menu 208") may be displayed. For example, media content options included in a media content menu may be displayed within menu section 206 as a viewable portion of menu 208.

A user of the computing device may provide any suitable input (e.g., touch gestures on a touch screen display) to trigger a scrolling of menu 208 within menu section 206. For instance, the user may slide his or her finger upward on the surface of a touch screen display within menu section 206 to cause user interface facility 102 to scroll menu 208 upward within menu section 206. As menu 208 scrolls within menu section 206, elements representing media content options included in menu 208 may be scrolled off screen and/or on screen within menu section 206 in a generally linear manner.

To illustrate, menu 208 may include menu display areas 210 (e.g., menu display areas 210-1, 210-2, and 210-3) within which menu display content associated with certain media content options included in menu 208 may be displayed on screen. Each of the menu display areas 210 may be associated with a different one of the media content options included in menu 208. In response to a scroll input provided by the user of the computing device, user interface facility 102 may cause menu 208 to scroll within menu section 206. The scrolling may cause one or more of menu display areas 210 to scroll off screen and one or more other menu display areas 210 associated with one or more other media content options included in menu 208 to scroll on screen into menu section 206 in a generally linear manner.

In some examples, the media content options included in menu 208 may include a set of media feeds accessible by the computing device. As mentioned, media feed data 108 stored in storage facility 106 may include information associated with media feeds available to the computing device. In certain examples, media feed data 108 may represent the set of available media feeds as a linear and ordered array of media feeds. The array of media feeds may make up menu 208.

Figure 3:
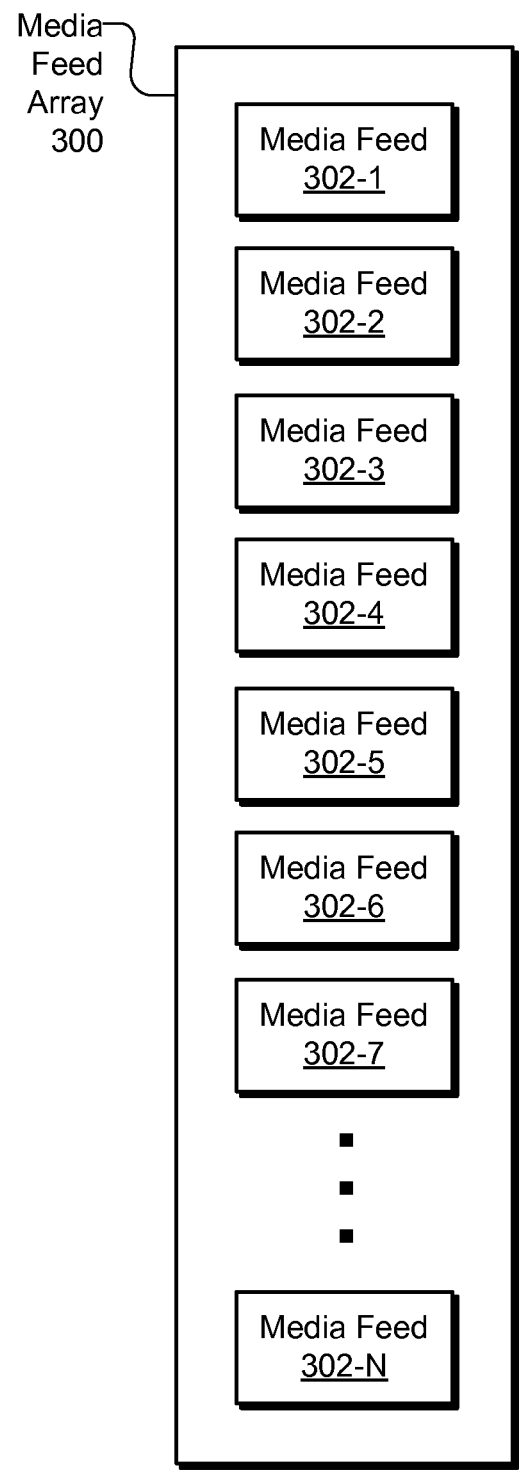
FIG. 3 illustrates an exemplary media feed data array according to principles described herein.

To illustrate, FIG. 3 shows an exemplary media feed array 300 that includes a linear and ordered arrangement of data representative of a plurality of media feeds 302 (e.g., media feeds 302-1 through 302-N). The arrangement of media feeds 302 within media feed array 300 may be in any particular order, and the order by which the media feeds 302 are arranged in media feed array 300 may be maintained and/or otherwise represented in menu 208. In certain examples, the media feeds 302 may comprise television programming channels, and media feed array 300 may represent a television channel lineup.

Figure 4:
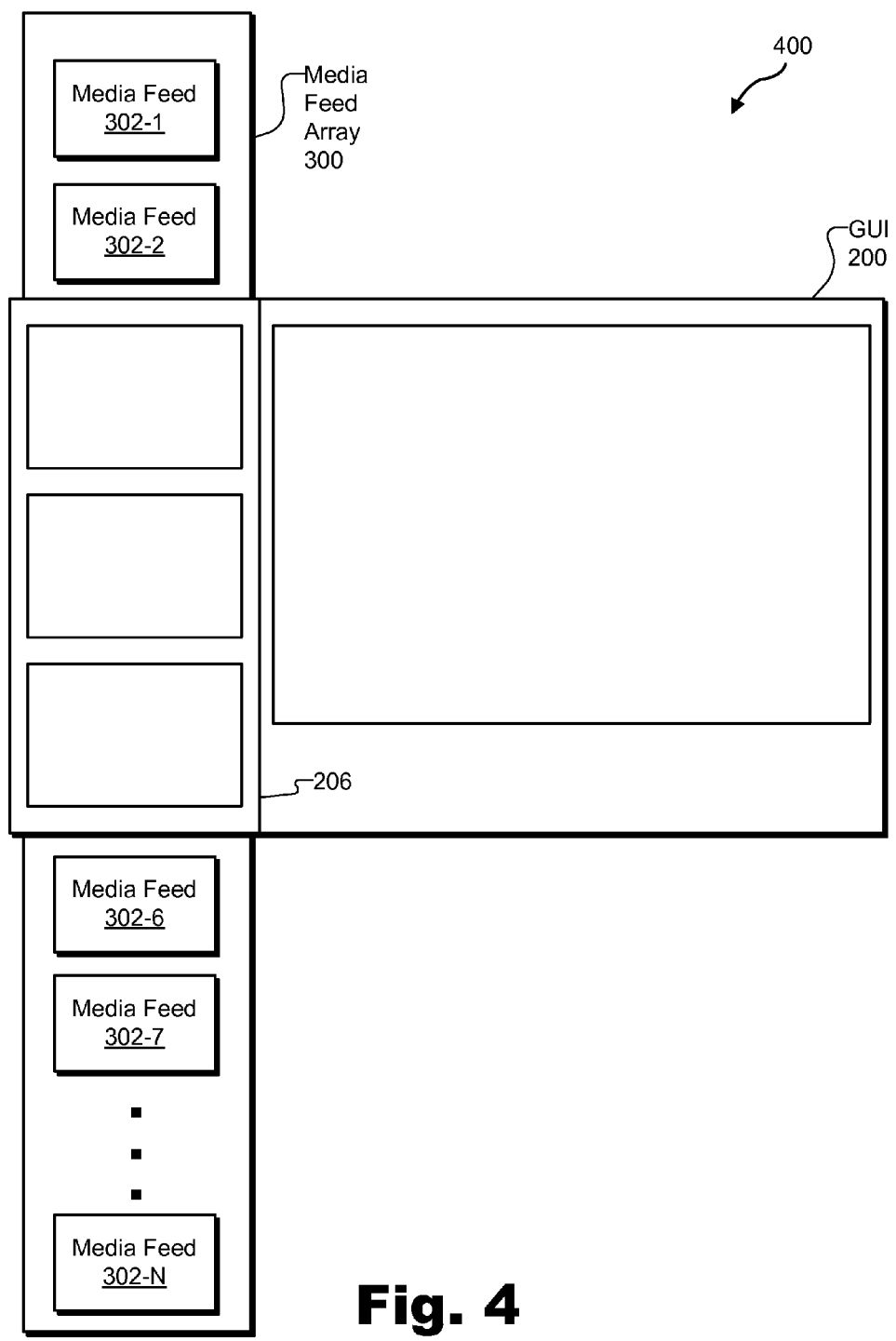
FIG. 4 illustrates an exemplary logical relationship between the graphical user interface of FIG. 2 and the media feed data array of FIG. 3 according to principles described herein.

FIG. 4 illustrates an exemplary logical relationship 400 between GUI 200 and media feed array 300. As shown, media feed array 300 may be logically positioned to scroll relative to menu section 206 of GUI 200 such that a subset of the media feeds 302 represented in the array 300 may be selected for representation within menu section 206 of GUI 200. In the example illustrated in FIG. 4, media feeds 302-1, 302-2, and 302-6 through 302-N are logically positioned off screen and will not be represented in menu section 206 of GUI 200. Media feeds 302-3, 302-4, and 302-5 are logically positioned within menu section 206 of GUI 200 (obscured by menu section 206 of GUI 200 in FIG. 4) and will be represented in menu section 206 of GUI 200. Specifically, media feed 302-3 may be represented within display area 210-1, media feed 302-4 may be represented within display area 210-2, and media feed 302-5 may be represented within display area 210-3 in menu section 206 of GUI 200. When menu 208 is scrolled (vertically up or down) within menu section 206, media feed array 300 may be logically repositioned relative to GUI 200 and a different subset of media feeds 302 may be logically positioned within and represented in menu section 206 of GUI 200.

Menu display content associated with media feeds 302 may be displayed within display areas 210 to represent the media feeds 302 logically positioned within menu section 206. To this end, user interface facility 102 may selectively associate menu display content with media feeds 302 in a manner designed to facilitate convenient, intuitive, seamless, and/or user-friendly navigation of menu 208 of media feeds 302 and/or experiencing of media programs associated with the media feeds within menu section 206.

Figure 5:
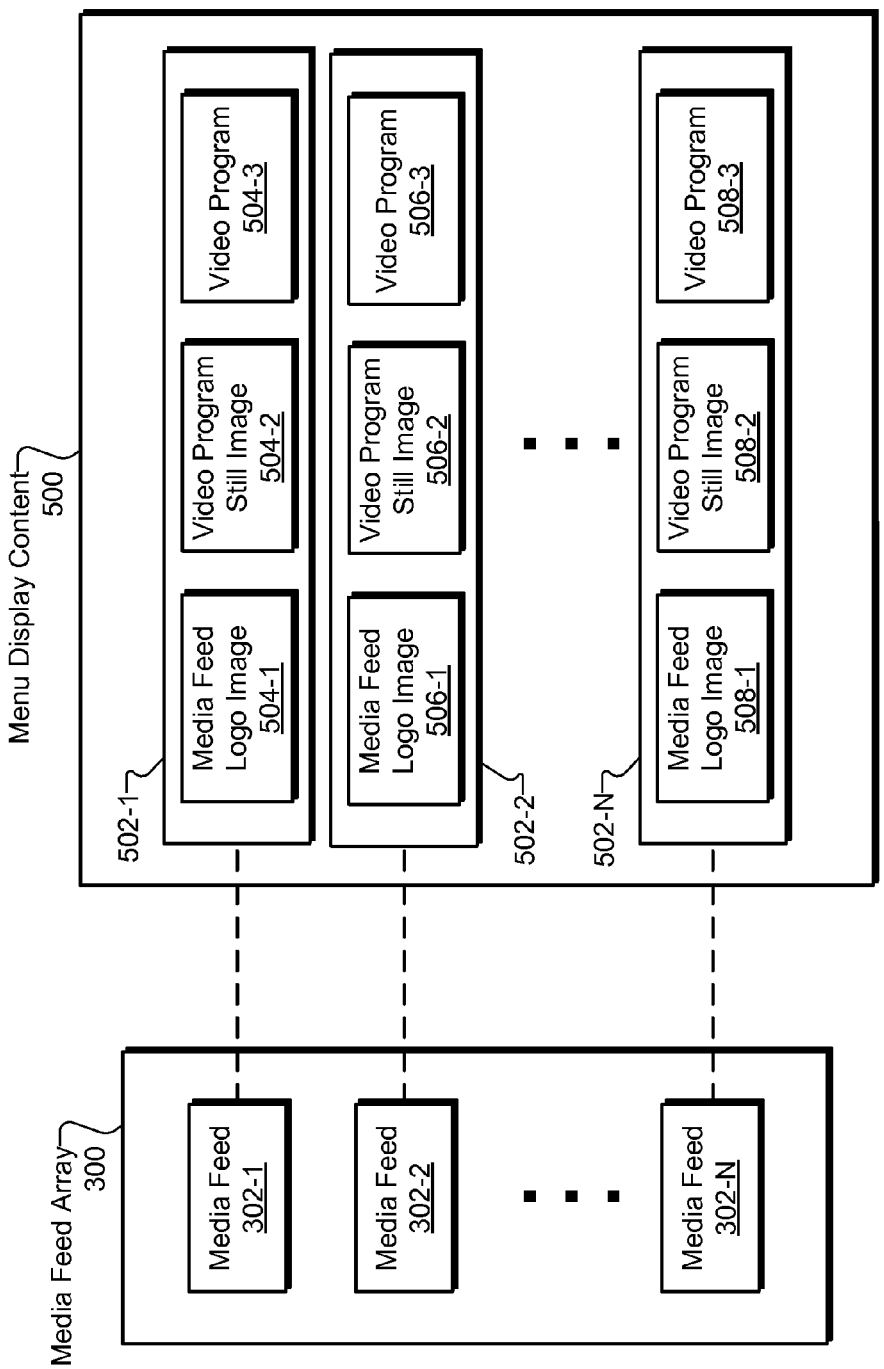
FIG. 5 illustrates an exemplary set of menu display content options associated with media feeds according to principles described herein.

User interface facility 102 may be configured to select, e.g., from a group of menu display content options for each media feed, menu display content to be associated with each media feed and displayed to represent each appropriately positioned media feed within menu section 206. To illustrate, FIG. 5 shows an exemplary set of menu display content 500 associated with media feeds 302 and from which specific menu display content may be selected and associated with media feeds 302 to represent the media feeds 302 in menu section 206 of GUI 200. As shown, the set of menu display content 500 may include groups 502 (e.g., groups 502-1 through 502-N) of menu display content options respectively associated with media feeds 302.

Each of the groups 502 may include one or more menu display content options associated with each of the media feeds 302. For example, group 502-1 includes media content options 504 that include a media feed logo image option 504-1, a video program still image option 504-2, and a video program option 504-3 associated with media feed 302-1, group 502-2 includes media content options 506 that include a media feed logo image option 506-1, a video program still image option 506-2, and a video program option 506-3 associated with media feed 302-2, and group 502-N includes media content options 508 that include a media feed logo image option 508-1, a video program still image option 508-2, and a video program option 508-3 associated with media feed 302-N. User interface facility 102 may be configured to select, for use in menu section 206, menu display content to be associated with media feed 302-1 from group 502-1, menu display content to be associated with media feed 302-2 from group 502-2, and menu display content to be associated with media feed 302-N from group 502-N.

The menu display content options included in each group 502 may include different types of display content. In the example illustrated in FIG. 5, for instance, each group 502 may include a media feed logo image type option, a video program still image type option, and a video program type option. In certain examples, these options may include a video type option and one or more still image type options.

The media feed logo image option may include a media feed logo image, such as a still image that contains a logo for a media feed. For example, a media feed logo image may include a programming channel logo image, such as an image of a logo for a programming channel such as "The History Channel" when the media feed comprises "The History Channel."

The video program still image option may include a still image of a video program associated with a media feed (e.g., a video program currently streaming and/or otherwise accessible by way of the media feed). For example, when the media feed comprises "The History Channel," a video program still image may include a still image from video of a media program accessible by way of "The History Channel," such as a still image from video of a television program known as "Outback Hunters."

In certain examples, a video program still image may include a single frame of a video program. In such examples, the single frame may be displayed as a single, still image in a display area 210 in menu section 206.

In other examples, a video program still image may include a set of multiple frames of the video program. In such examples, the frames in the set may be displayed, in turn, in menu section 206 in a repeating cycle. The frames may be cyclically displayed in turn at any suitable speed, such as by transitioning from one frame to the next each second of time. Such a cyclical display of a set of frames (e.g., a set of three different frames of the video program) may produce frame-to-frame motion in a display area 210 that is similar in effect to true video motion, without requiring the resources associated with streaming and displaying video.

The video program option may include a video program associated with a media feed (e.g., a video program currently streaming and/or otherwise accessible by way of the media feed). For example, when the media feed comprises "The History Channel," the video program may include video of a media program accessible by way of "The History Channel," such as the television program known as "Outback Hunters."

User interface facility 102 may be configured to select menu display content to represent media feeds 302 in menu section 206 based on a menu display content selection heuristic ("selection heuristic"), which may specify one or more predefined menu display content selection criteria. Examples of such criteria may include, without limitation, a scroll status of menu 208 in menu section 206, availability of menu display content (e.g., availability of a type of menu display content) for a media feed 302, and a position of a display area 210 associated with a media feed 302 within menu section 206. Any combination or sub-combination of these criteria and/or additional and/or alternative criteria specified by the selection heuristic may be used by user interface facility 102 to select menu display content.

In certain examples, user interface facility 102 may be configured to select menu display content for a media feed 302 based at least in part on a scroll status of menu 208. To this end, user interface facility 102 may be configured to determine a scroll status of menu 208. The determination may be made in any suitable way. For example, user interface facility 102 may be configured to monitor, over time while GUI 200 is displayed, the scroll status of menu 208.

As used herein, the term "scroll status" may refer to any operation and/or condition related to scrolling of a user-scrollable menu such as menu 208. The scroll status of a menu may indicate whether the menu is stationary or non-stationary. In some examples, user interface facility 102 may be configured to determine that the scroll status of a menu is "stationary" when there has been no scroll movement of the menu for at least a predefined length of time. Conversely, user interface facility 102 may be configured to determine that the scroll status of a menu is "non-stationary" when scroll movement has occurred within the predefined length of time.

In certain examples, user interface facility 102 may be configured to select a video program associated with a media feed 302 to represent the media feed 302 in menu 208 when the scroll status of menu 208 comprises a stationary scroll status. Conversely, user interface facility 102 may be configured to select either a video program still image or a media feed logo image associated with the media feed 302 to represent the media feed 302 in menu 208 when the scroll status of menu 208 comprises a non-stationary scroll status. To illustrate, for media feed 302-1, user interface facility 102 may be configured to select video program 504-3 to represent the media feed 302 in menu 208 when the scroll status of menu 208 comprises a stationary scroll status, and to select either video program still image 504-2 or media feed logo image 504-1 to represent the media feed 302 in menu 208 when the scroll status of menu 208 comprises a non-stationary scroll status.

In some examples, user interface facility 102 may be configured to detect a change in the scroll status of menu 208. In response to the detection, user interface facility 102 may change a selection of menu display content to be used to represent a media feed 302 in menu 208. For example, when the scroll status changes from a non-stationary scroll status to a stationary scroll status, user interface facility 102 may change a selection of a media feed logo image or a video program still image to a selection of a video program associated with a media feed 302 to represent the media feed 302 in menu 208. As another examples, when the scroll status changes from a stationary scroll status to a non-stationary scroll status, user interface facility 102 may change a selection of a video program to a selection of a media feed logo image or a video program still image associated with a media feed 302 to represent the media feed 302 in menu 208.

In certain examples, user interface facility 102 may be configured to select menu display content to represent a media feed 302 in menu 208 based at least in part on availability of menu display content for the media feed 302. For example, user interface facility 102 may be configured to prioritize selection of video program still images over selection of media feed logo images to represent media feeds 302. In such examples, user interface facility 102 may be configured to determine whether a video program still image associated with a media feed 302 is available. The determination may be made in any suitable way. For example, user interface facility 102 may be configured to determine whether a video program still image for the media feed 302 is stored locally by the computing device that provides GUI 200 for display, which may allow user interface facility 102 to use the video program still image to represent the media feed in menu 208 without having to make a separate, reactive call for the video program still image to a remote source such as a remote server.

User interface facility 102 may be configured to select the video program still image associated with the media feed 302 to represent the media feed 302 in menu 208 when the video program still image is determined to be available. Conversely, user interface facility 102 may be configured to select a media feed still image associated with the media feed 302 to represent the media feed 302 in menu 208 when a video program still image associated with the media feed 302 is determined to be unavailable. To illustrate, for media feed 302-1, user interface facility 102 may be configured to select video program still image 504-2 to represent the media feed 302 in menu 208 when video program still image 504-2 is determined to be available, and to select media feed logo image 504-1 to represent the media feed 302 in menu 208 when video program still image 504-2 is determined to be unavailable.

In certain examples, user interface facility 102 may be configured to select menu display content to represent a media feed 302 in menu 208 based at least in part on a position of a menu display area 210 associated with the media feed 302 within menu section 206. For example, referring again to FIG. 2, menu display area 210-2 is located at a central position within menu section 206 and may be referred to as the "central" menu display area of menu section 206. In certain implementations, user interface facility 102 may be configured to selectively display video content only within the central display area and not within the other display areas of menu section 206. Accordingly, user interface facility 102 may be configured to select a video program associated with a media feed 302 to represent the media feed 302 in central menu display area 210-2 when the scroll status of menu 208 is stationary, and to select either video program still images or media feed logo images to represent media feeds 302 in non-central display areas 210-1 and 210-3 in menu section 206.

User interface facility 102 may be configured to populate menu display areas 210 of media section 206 with menu display content that has been selected to represent media feeds 302 associated with the menu display areas 210. The populating may be performed in way suitable for displaying menu display content of a user-scrollable menu such as menu 208.

When the selected menu display content comprises a media feed logo image or a video program still image associated with a media feed 302, user interface facility 102 may populate the menu display area 210 associated with the media feed 302 by displaying the selected image within the menu display area 210. When the selected menu display content comprises a set of still images of a video program associated with a media feed 302, user interface facility 102 may populate the menu display area 210 associated with the media feed 302 by cyclically displaying, in turn, each still image in the set of still images within the menu display area 210, such as described herein. When the selected menu display content comprises a video program associated with a media feed 302, user interface facility 102 may populate the menu display area 210 associated with the media feed 302 by instructing media player facility 104 to access and play back the video program in the menu display area 210.

In certain examples, the populating may include replacing one type of menu display content with another type of menu display content. For example, when a scroll status of menu 208 changes and different menu display content is selected for a media feed 302 as described above, user interface facility 102 may replace the previously selected menu display content with the currently selected menu display content in a menu display area 210 associated with the media feed 302. For example, a playback of a video program may replace a still image in response to a scroll status of menu 206 changing to a stationary status. As another example, a still image may replace a playback of a video program in response to a scroll status of menu 206 changing to a non-stationary status.

Media player facility 104 may be configured to access, process, and/or present media content for experiencing by a user. For example, media player facility 104 may be configured to access a media feed 302 and process and play back a media program associated with the media feed. This may be performed in any suitable way. For instance, media player facility 104 may receive an instruction from user interface facility 102 to access the media feed 302. Media player facility 104 may access the media feed 302 such as by requesting and receiving a media stream from a media streaming server. Media player facility 104 may then present the accessed media content within the context of a user interface provided by user interface facility 102. For example, media player facility 104 may be configured to play back a video program associated with a media feed 302 within a display area 210 of GUI 200.

Figure 6:
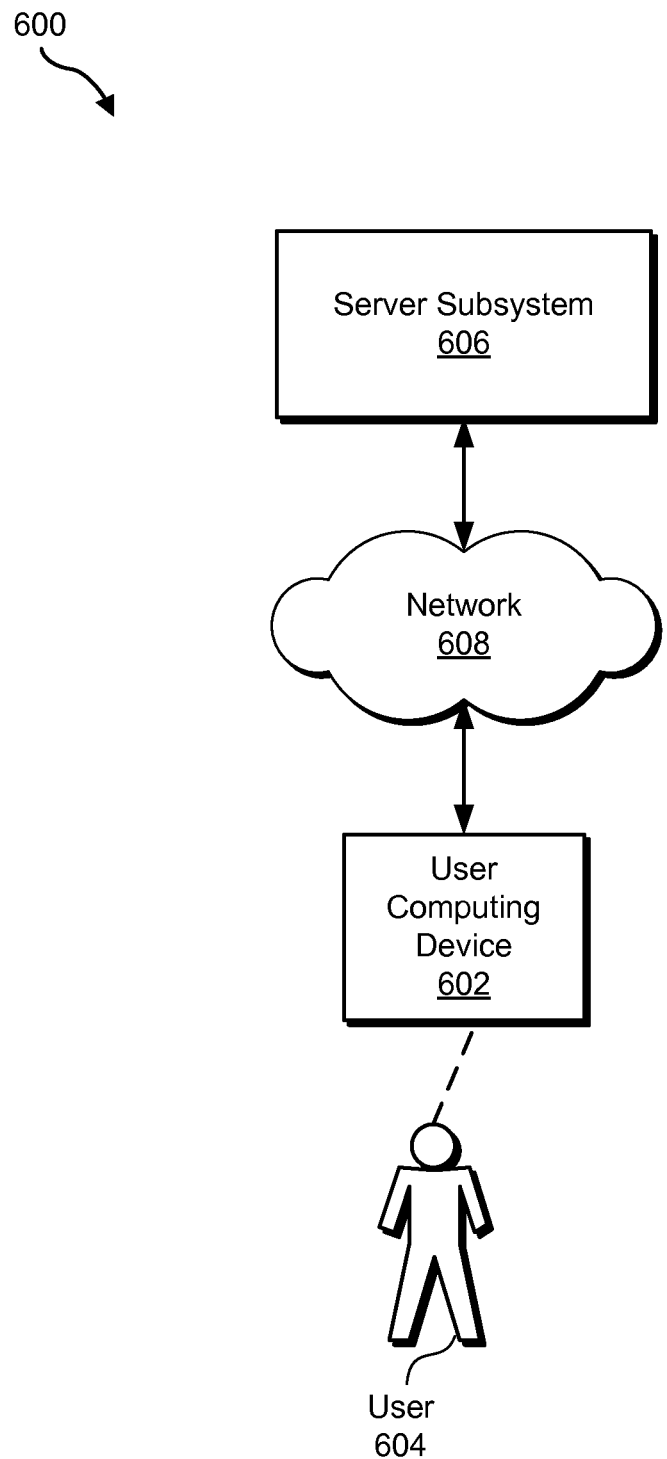
FIG. 6 illustrates an exemplary client-server implementation of the system of FIG. 1 according to principles described herein.

FIG. 6 illustrates an exemplary implementation 600 of system 100. As shown, implementation 600 may include a user computing device 602 (e.g., a tablet computer, smartphone device, or any other device capable of accessing media feeds and providing a GUI such as GUI 200 for display on a display screen) associated with a user 604. User computing device 602 may be in communication with a server subsystem 606, which may include one or more computing devices (e.g., server devices remotely located from user computing device 602). In implementation 600, facilities 102-106 of system 100 may be implemented entirely by user computing device 602 or distributed across user computing device 602 and server subsystem 606.

User computing device 602 and server subsystem 606 may communicate using any communication platforms and technologies suitable for transporting data (e.g., media content data associated with media feeds) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, and other suitable communications technologies.

In certain embodiments, user computing device 602 and server subsystem 606 may communicate via a network 608. Network 608 may include one or more networks, such as one or more wireless networks (Wi-Fi networks), wireless communication networks, mobile telephone networks (e.g., cellular telephone networks), closed media networks, open media networks, closed communication networks, open communication networks, the Internet, local area networks, and any other networks capable of carrying data (e.g., streaming media) and/or communications signals between user computing device 602 and server subsystem 606. Communications between user computing device 602 and server subsystem 606 may be transported using any one of the above-listed networks, or any combination or sub-combination of the above-listed networks. Alternatively, user computing device 602 and server subsystem 606 may communicate in another way such as by one or more direct connections between user computing device 602 and server subsystem 606.

Server subsystem 606 may be configured to provide media feeds 302 for access by user computing device 602 by way of network 608. In certain examples, the media feeds 302 may include media program streams configured to be requested by user 604 of computing device 602, transmitted by server subsystem 606, and received and processed by user computing device 602 to present the media programs carried in the streams for experiencing by user 604. Server subsystem 606 may generate and transmit the media program streams to user computing device 602 using any suitable streaming (e.g., Internet media streaming) technologies. In some examples, server subsystem 606 may provide media feeds to user computing device 602 as part of a media streaming service provided to user 604 by a media streaming service provider (e.g., a live television streaming service provided by a live television service provider).

User computing device 604 may be configured to provide GUI 200 for display on a display screen, such as a display screen integrated in user computing device 604 and/or connected to user computing device 604. In certain examples, user computing device 604 may be configured to perform one or more of the operations of user interface facility 102 and/or media player facility 104 described herein in order to provide GUI 200.

To illustrate, in certain implementations, user interface facility 102 and media player facility 104 may be implemented as a software application (e.g., a media player application) installed and executing on user computing device 602. The application may include or otherwise access media feed logo images for media feeds accessible by user computing device 602 from server subsystem 606. The media feed logo images may be stored locally in memory of user computing device 602.

When the application is loaded by user computing device 602, the application may select the media feed logo images to represent the media feeds in menu 208. Thus, at least initially, the media feed logo images may be selected for use in menu 208 by default.

The application may run a background process configured to obtain, from server subsystem 606, still images of video of one or more of the media programs associated with one or more of the media feeds 302 provided by server subsystem 606. The background process may periodically (e.g., at start times for media programs, at set time intervals, or in any other periodic manner) request still images of the media programs from server subsystem 606. Alternatively, server subsystem 606 may be configured to periodically (e.g., at start times for media programs, at set time intervals, or in any other periodic manner) push still images of media programs to user computing device 602 for use by the background process.

Server subsystem 606 may generate still images of streaming media programs in any suitable way. For example, server subsystem 606 may include and/or communicate with a media stream encoder to access a single frame or a set of frames (e.g., a set of three frames) of a streaming media program and generate one or more image data files containing the frame(s). Server subsystem 606 may provide the image data file(s) to user computing device 102 in the background to avoid interruption to operations of the application running on user computing device 102.

The background process of the application may receive image data files from server subsystem 606 and associate the still images of the media programs contained in the image data files with corresponding media feeds 302 in local memory of user computing device 102. Going forward, the application may then determine that the locally stored still images are available and select the still images to represent the media feeds in menu 208 in GUI 200, such as described herein.

In certain examples, the application may obtain still images of video programs for some media feeds 302 but not for other media feeds 302 represented in menu 208. Accordingly, certain media feeds 302 may be represented by still images of video content and other media feeds 302 may be represented by media feed logo images in menu 208. When a still image of a video program associated with a media feed becomes available, the application may replace a media feed logo image with the still image of the video program in menu 208.

Still images of video programs associated with media feeds 302 that are accessed and locally stored within memory of user computing device 602 may be expired by the application. For example, the still images may become stale and/or outdated after live transmission times of the video programs end, a predefined length of time after the still images of video programs would have been presented in accordance with a transmission schedule, and/or after new and more up-to-date still images of the video programs are obtained by user computing device 602. After still images of video programs expire, the application may elect not to use the still images and/or may delete the still images from local memory. If no replacement still images of the video programs have been obtained and stored in local memory, the application may revert back to selecting the media feed logo images associated with the media feeds 302 to represent the media feeds 302 in menu 208.

In certain examples, the media programs associated with media feeds 302 provided by server subsystem 606 may include live television programs that are streamed in accordance with a television programming schedule. Accordingly, when user computing device 602 requests and receives a media program stream, the media content included in the stream is determined based on the transmission schedule and the time at which the stream is transmitted by server subsystem 606.

Figure 7:
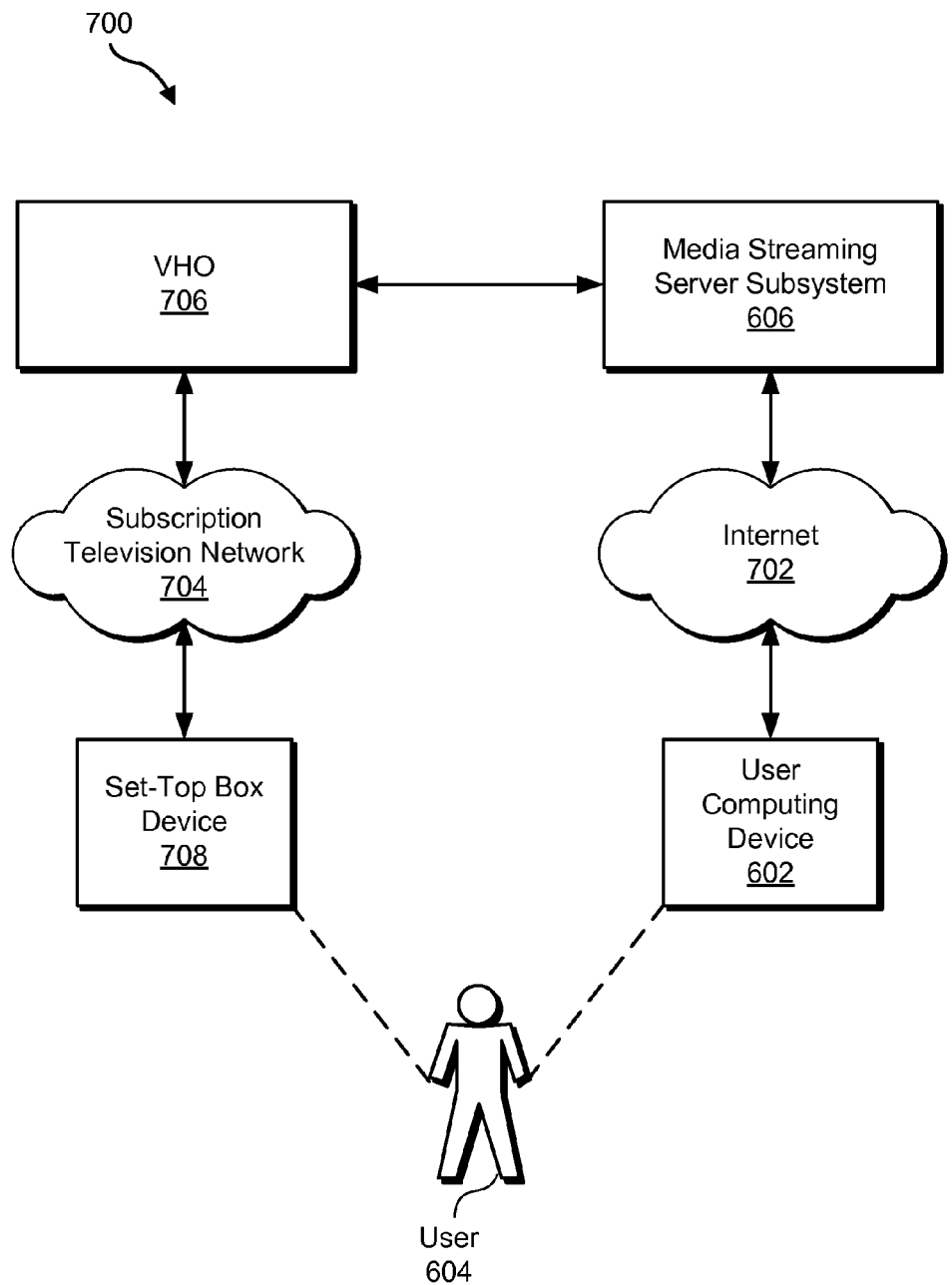
FIG. 7 illustrates an exemplary client-server implementation of the system of FIG. 1 as part of a subscription television service according to principles described herein.

The streaming live television programs may coincide with live television programs broadcast and/or multicast to subscribers of a subscription television service by way of another distribution channel. To illustrate, FIG. 7 shows an exemplary implementation 700 of system 100. As shown, implementation 700 may include user computing device 602 and server subsystem 600 in communication one with another by way of the Internet 702. User computing device 602 may access media program streams provided by server subsystem 706 by way of the Internet 702, such as described herein. The media programs streamed by server subsystem 706 may include live television programs, which may include any of a set (e.g., a subset) of live television programs broadcast or multicast by way of a subscription television network 704.

To illustrate, FIG. 7 shows implementation 700 to include a video hub office ("VHO") 706, which may be configured to broadcast and/or multicast live television programs to one or more set-top box devices, such as set-top box device 708, by way of the subscription television network 704 (e.g., a cable and/or satellite television network). VHO 706 may broadcast or multicast live television programs on carrier channels mapped to specific television programming channels and at specific times in accordance with a television programming schedule.

Server subsystem 606 may obtain the live television programs from VHO 706 (or from another element included in or connected to subscription television network 704) and process the live television programs in order to stream the live television programs over the Internet 702 in accordance with the same television programming schedule.

Accordingly, user 604 may utilize set-top box device 708 or user computing device 602 to access and experience live television programs. A television service provider may provide the live television programs for access by user 604 over both distribution channels as part of a subscription television service.

To further illustrate principles described herein, exemplary GUI views, such as exemplary GUI views of GUI 200, will now be described.

Figure 8:
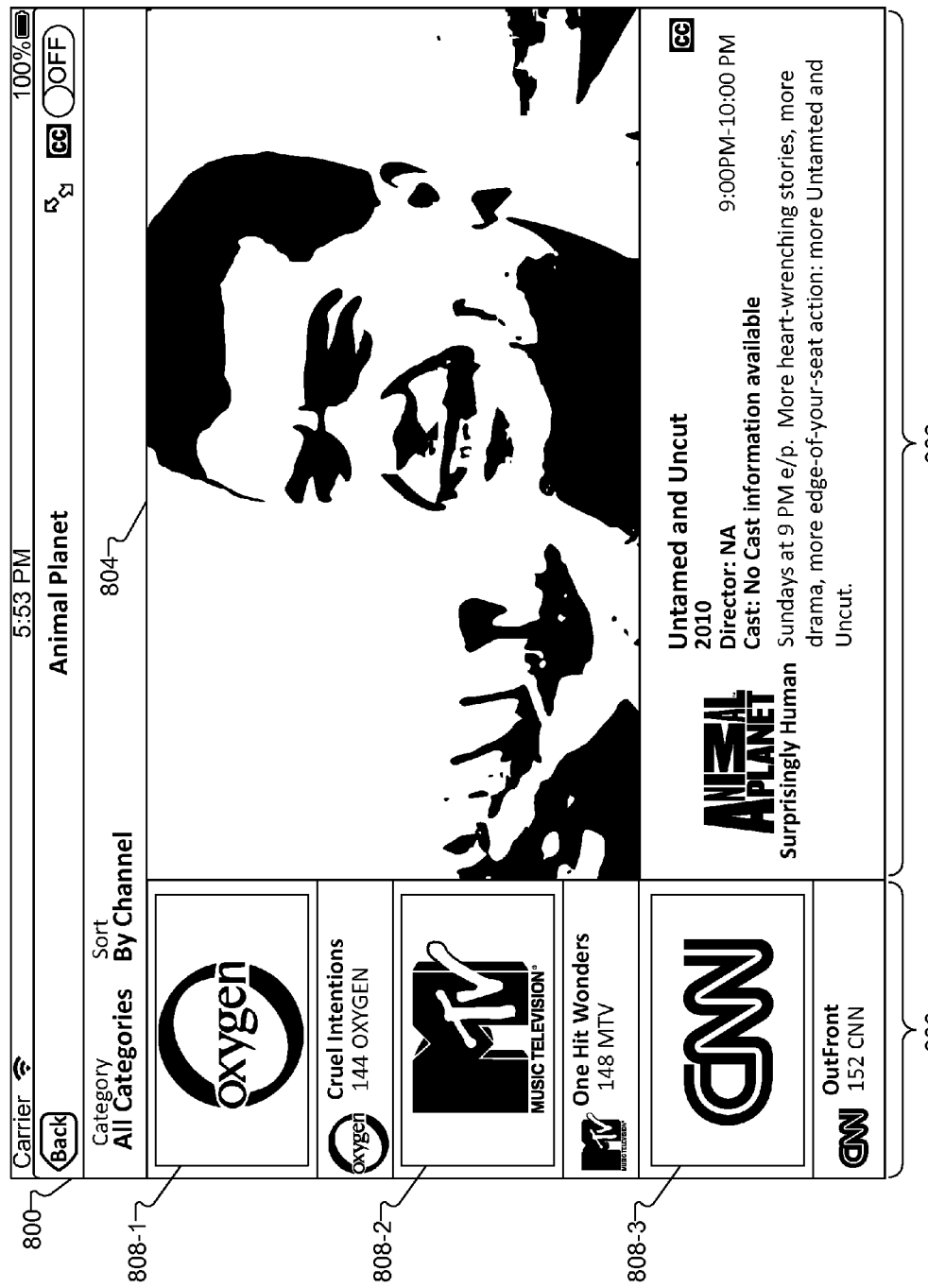
FIGS. 8-13 illustrate exemplary graphical user interface views according to principles described herein.

FIG. 8 illustrates an exemplary GUI view 800. As shown, GUI view 800 may include a main display section 802 having a main display area 804. A primary video program may be played back within main display area 804, such as is shown. In the illustrated example, a television program known as "Untamed and Uncut" and associated with a television programming channel known as "Animal Planet" is being played back in main display area 804.

GUI view 800 may further include a menu section 806 within which media content menu options of a user-scrollable media content menu may be represented in menu display areas 808 (e.g., menu display areas 808-1, 808-2, and 808-3), such as described herein. In the illustrated example, menu display areas 808 contain media feed logo images displayed therein, and the media feed logo images comprise channel logo images associated with television programming channels known as "Oxygen," "MTV," and "CNN." System 100 may be configured to select and use the channel logo images to populate menu display areas 808, such as described herein.

Below each of menu display areas 808, information associated with the television programming channels is also displayed, which information may include channel logos, names and numbers for the television programming channels, and titles of the television programs currently associated with the television programming channels.

Figure 9:
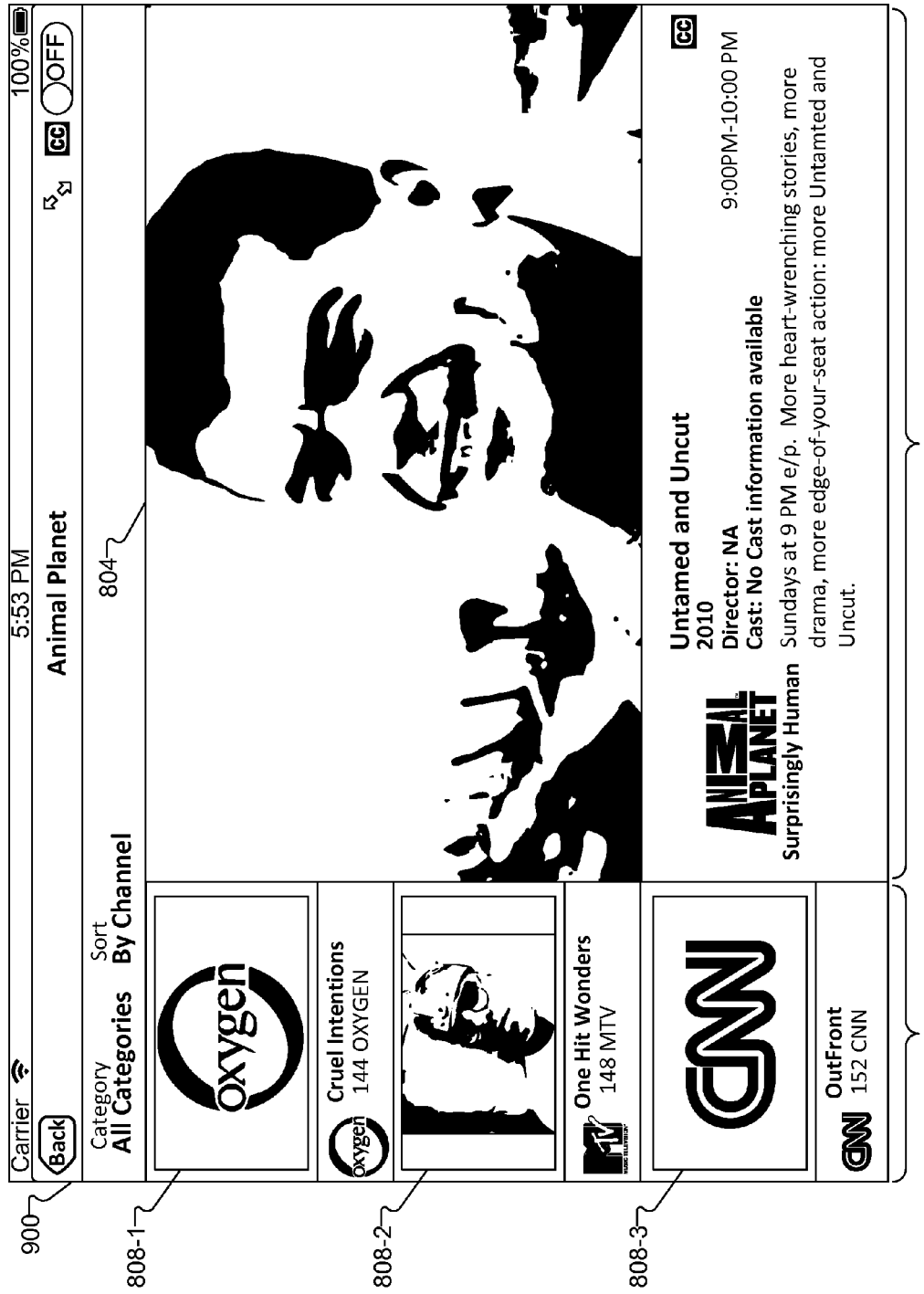

FIG. 9 illustrates an exemplary GUI view 900. As shown, GUI view 900 may be as GUI view 800 of FIG. 8, except that menu display area 808-2 now contains a playback of video of a television program instead of a channel logo image. Specifically, menu display area 808-2 now displays a playback of video of a television program known as "One Hit Wonders." System 100 may be configured to replace the channel logo image with the video playback of the television program, such as described herein. For example, system 100 may determine that a scroll status of a user-scrollable media content menu is stationary and that menu display area 808-1 is located at a central position within menu section 808. In response, system 100 may access and play back the video of the television program associated with the television programming channel in menu display area 808-2.

GUI view 900 may be presented such as when system 100 is configured to display video playback within menu section 806 only for the menu display area that is centrally located within menu section 806. In other examples, system 100 may be configured to concurrently display video playback within more than one of the menu display areas 808 included in menu section 806.

Figure 10:
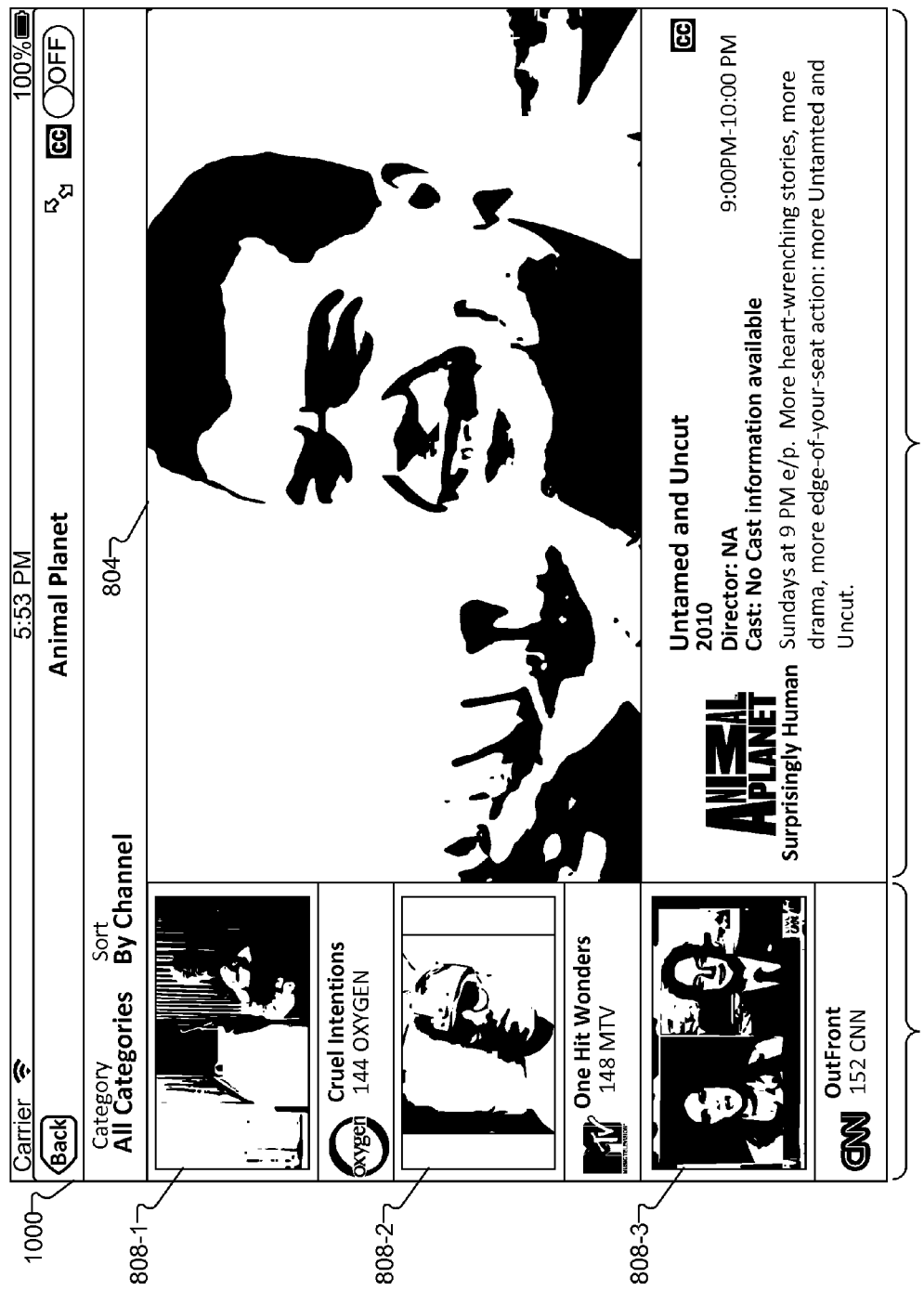

To illustrate, FIG. 10 shows an exemplary GUI view 1000, which is similar to GUI view 900 of FIG. 9, except that menu display areas 808-1 and 808-3 now contain playback of video of television programs instead of channel logo images. Specifically, menu display area 808-1 now displays a playback of video of a television program known as "Cruel Intentions," and menu display area 808-3 now displays a playback of video of a television program known as "OutFront." System 100 may be configured to replace the channel logo images with video playback of the television programs, such as described herein.

During a display of any of GUI views 800, 900, and 1000, a user of a computing device that provides the GUI view for display may provide user input to scroll a menu within menu section 806, such as described herein. In response to the user input, system 100 may scroll the menu, which may include animating a scroll movement of menu display areas within menu section 806. The scroll movement may include showing one or more of menu display areas 808 as moving off screen and one or more other menu display areas moving on screen. During scrolling, system 100 may select still images (rather than video playback) for display in the menu display areas of the menu, such as described herein.

Figure 11:
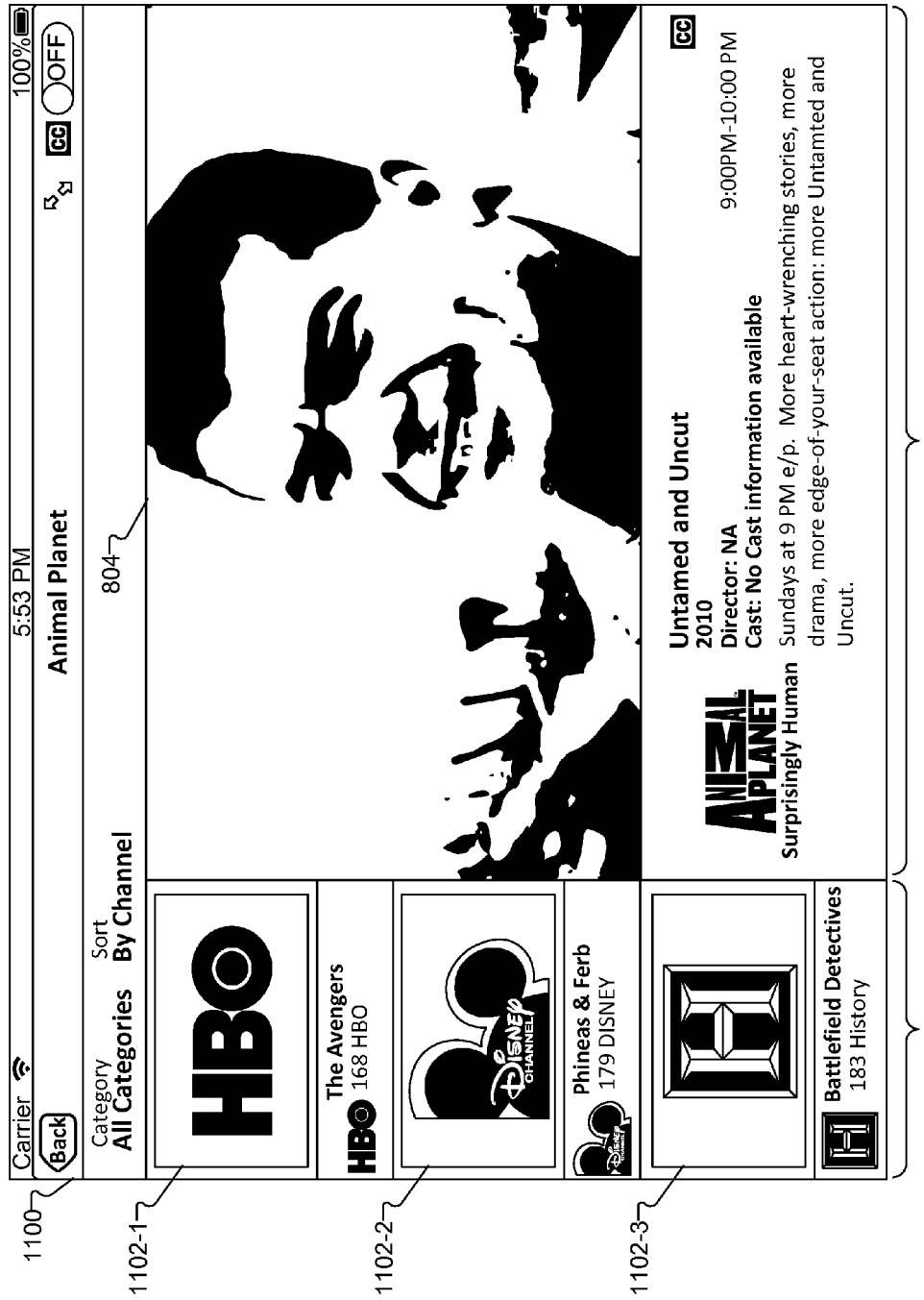

FIG. 11 illustrates an exemplary GUI view 1100. GUI view 1100 may represent a view as displayed after system 100 scrolls a menu within menu section 806. As shown, menu section 806 may now include a new set of menu display areas 1102 (e.g., menu display areas 1102-1, 1102-2, and 1102-3) that represent a new set of television programming channels (e.g., television programming channels known as "HBO," "The Disney Channel," and "The History Channel").

In GUI view 1100, menu display areas 1102 are populated with channel logo images for the corresponding television programming channels. In other examples, one or more of the menu display areas 1102 may be populated with still images of the television programs currently playing on the television programming channels. For example, system 100 may selectively populate each of the menu display areas 1102 with a channel logo image or a still image of the corresponding television program, such as described herein.

Figure 12:
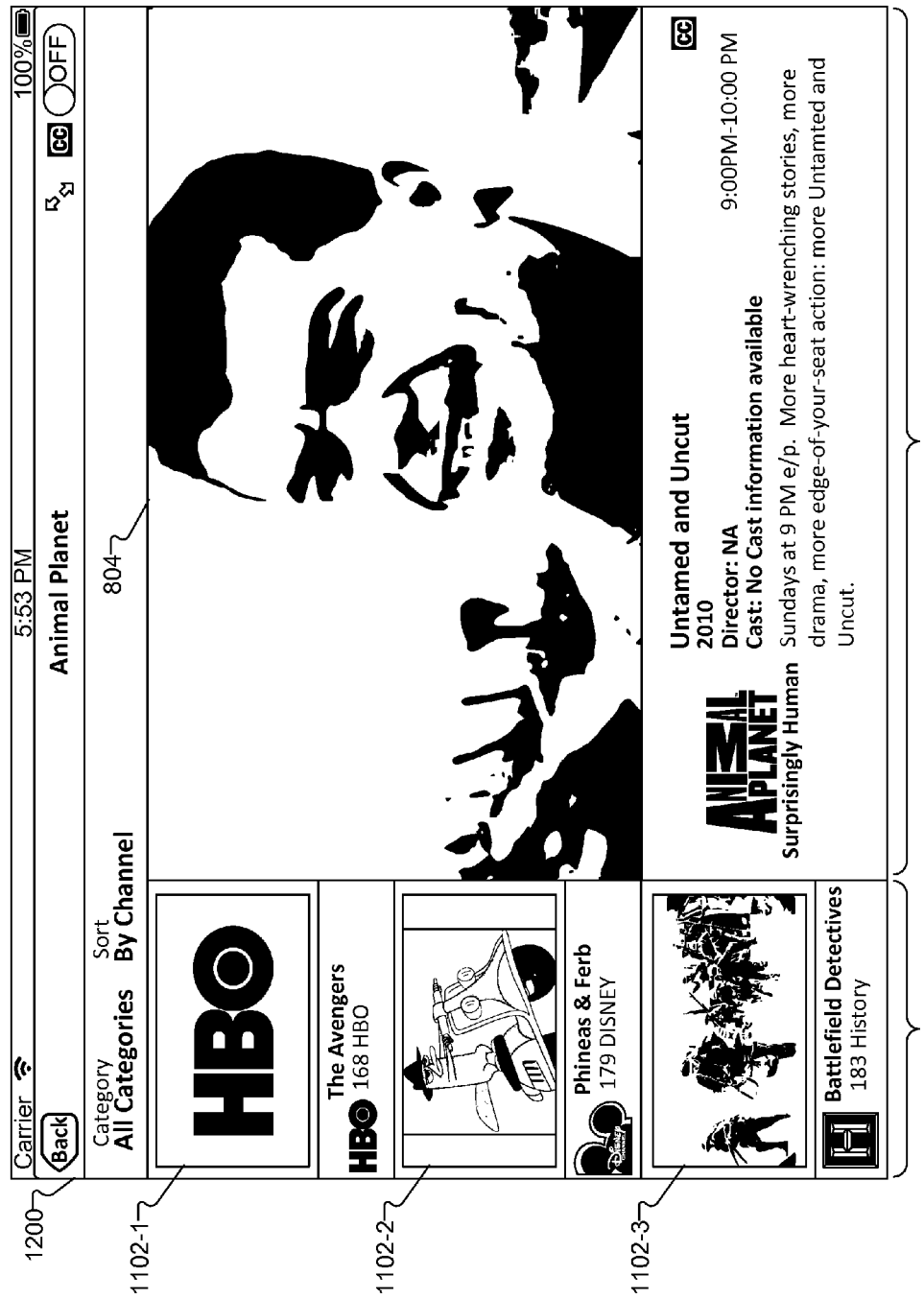

FIG. 12 illustrates an exemplary GUI view 1200. GUI view 1200 is similar to GUI view 1100 of FIG. 11, except that in GUI view 1200, menu display areas 1102-2 and 1102-3 contain still images of television programs (e.g., frame images of television programs known as "Pheneas & Ferb" and "Battlefield Detectives").

Figure 13:
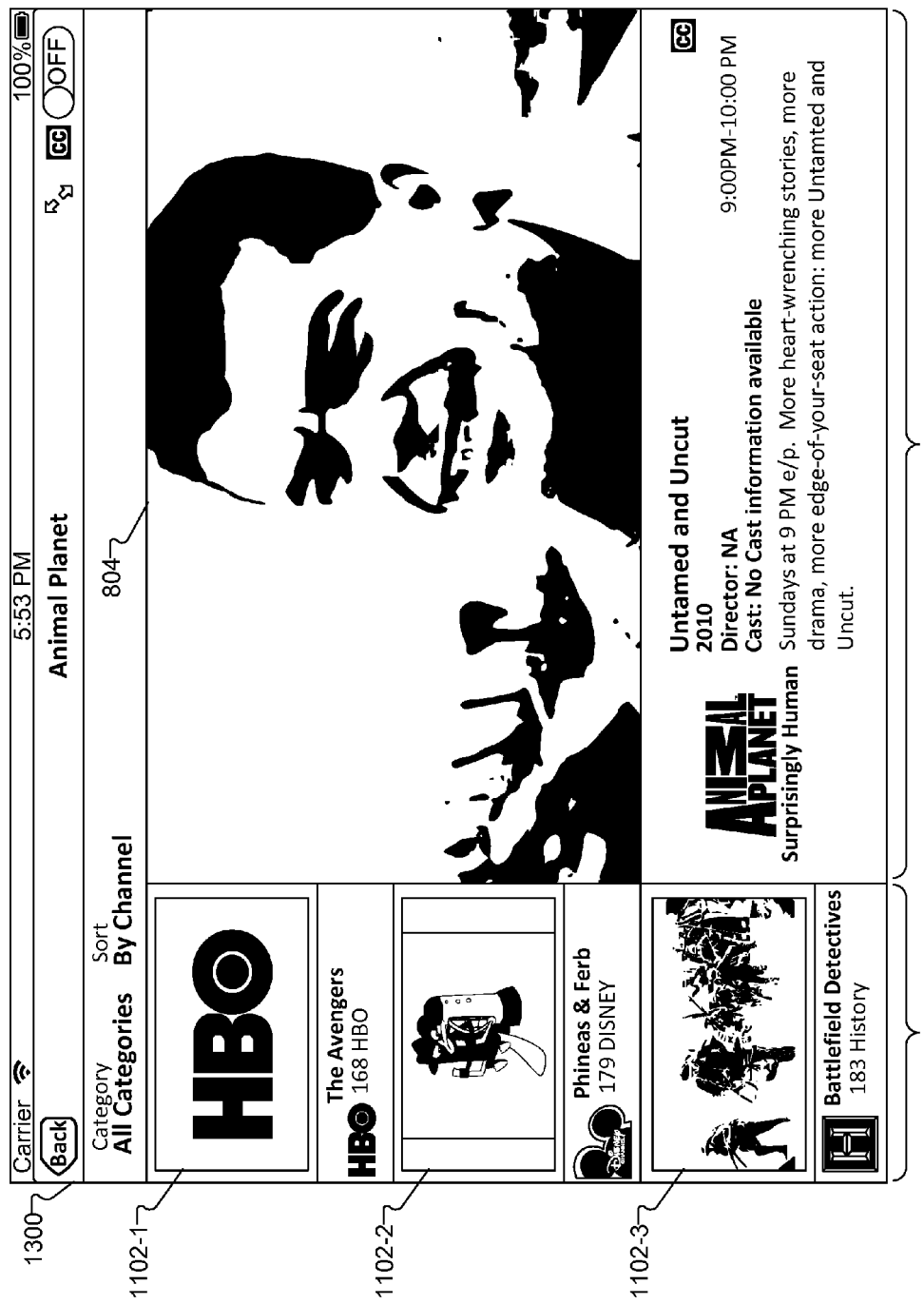

One or more of the still images in menu display areas 1102 may be replaced with video playback of television programs, such as described herein. FIG. 13 illustrates an exemplary GUI view 1300. GUI view 1300 is similar to GUI view 1200 of FIG. 12, except that in GUI view 1300, menu display area 1102-2 contains video playback of the television program associated with television programming channel represented by menu display area 1102-2. For example, menu display area 1102-2 now displays a playback of video of the television program known as "Pheneas & Ferb."

The exemplary GUIs represented by GUI 200 and GUI views 800, 900, 1000, 1100, 1200, and 1300 are illustrative only. Other GUIs and GUI views may be provided by system 100 in accordance with principles described herein.

Figure 14:
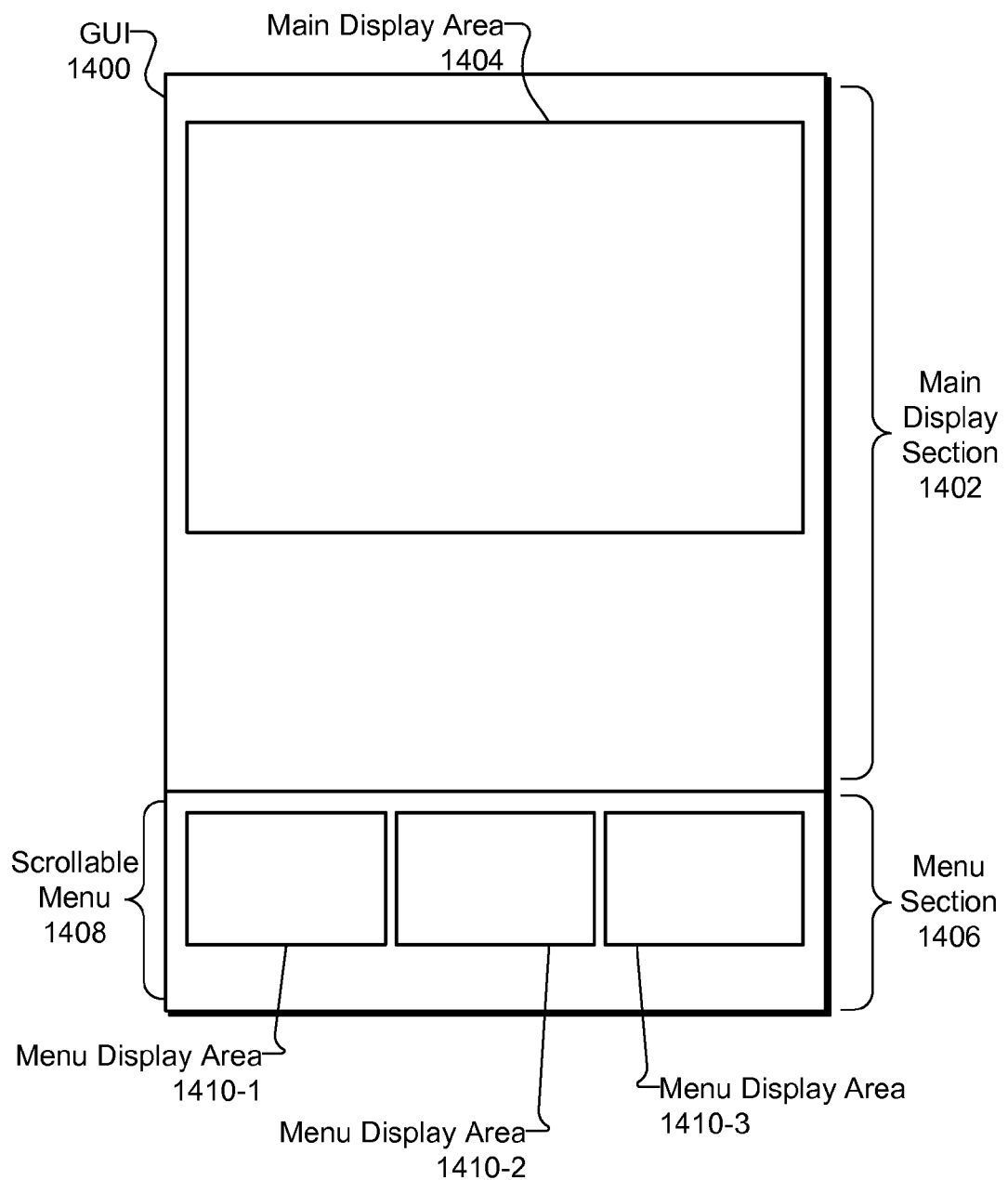
FIGS. 14-15 illustrate exemplary graphical user interfaces according to principles described herein.

As an example, FIG. 14 illustrates an exemplary GUI 1400, which may be a portrait-oriented version of GUI 200. As shown, GUI 1400 may include a main display section 1402 having a main display area 1404 within which a playback of a video program selected as a primary video program may be displayed. GUI 1400 may also include a menu section 1406 within which elements of a user-scrollable media content menu 1408 ("menu 1408") may be displayed. For example, media content options included in a media content menu may be displayed within menu section 1406 as a viewable portion of menu 1408. Menu 1408 may be scrolled (e.g., horizontally from side to side) within menu section 1406, such as described herein.

Menu 1408 may include menu display areas 1410 (e.g., menu display areas 1410-1, 1410-2, and 1410-3) within which menu display content associated with media content options included in menu 1408 may be displayed on screen. The menu display content may be selected for display within menu display areas 1410 by system 100 in any of the ways described herein.

Figure 15:
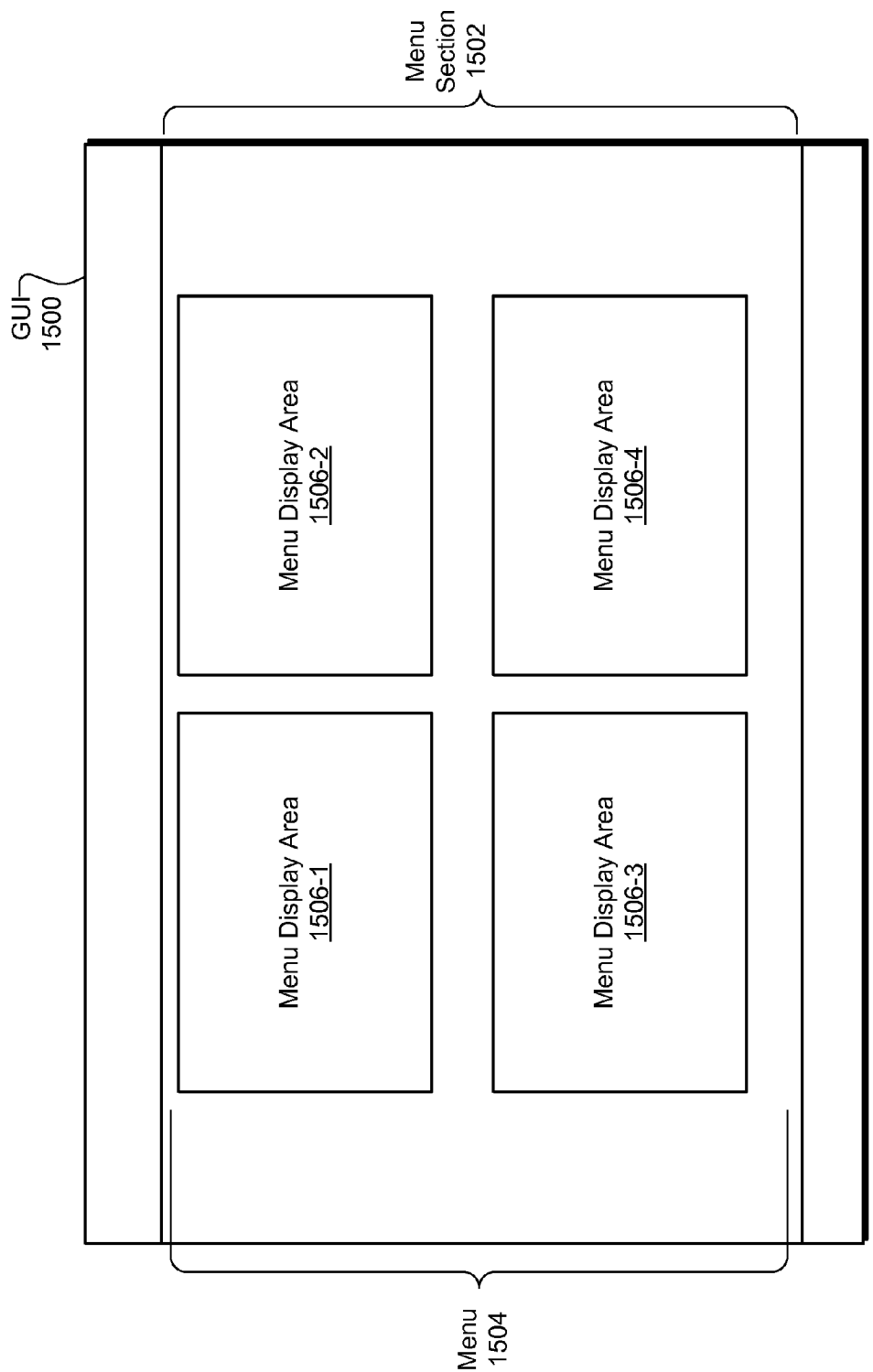

As another example, FIG. 15 illustrates an exemplary GUI 1500. As shown, GUI 1500 may include a menu section 1502 within which elements of a user-scrollable media content menu 1504 ("menu 1504") may be displayed. For example, media content options included in a media content menu may be displayed within menu section 1502 as a viewable portion of menu 1504. Menu 1504 may be scrolled (e.g., horizontally from side to side and/or vertically up or down) within menu section 1502, such as described herein.

Menu 1504 may include menu display areas 1506 (e.g., menu display areas 1506-1, 1506-2, and 1506-3) within which menu display content representative of media content options included in menu 1504 may be displayed. The menu display content may be selected for display within menu display areas 1506 by system 100 in any of the ways described herein.

Figure 16:
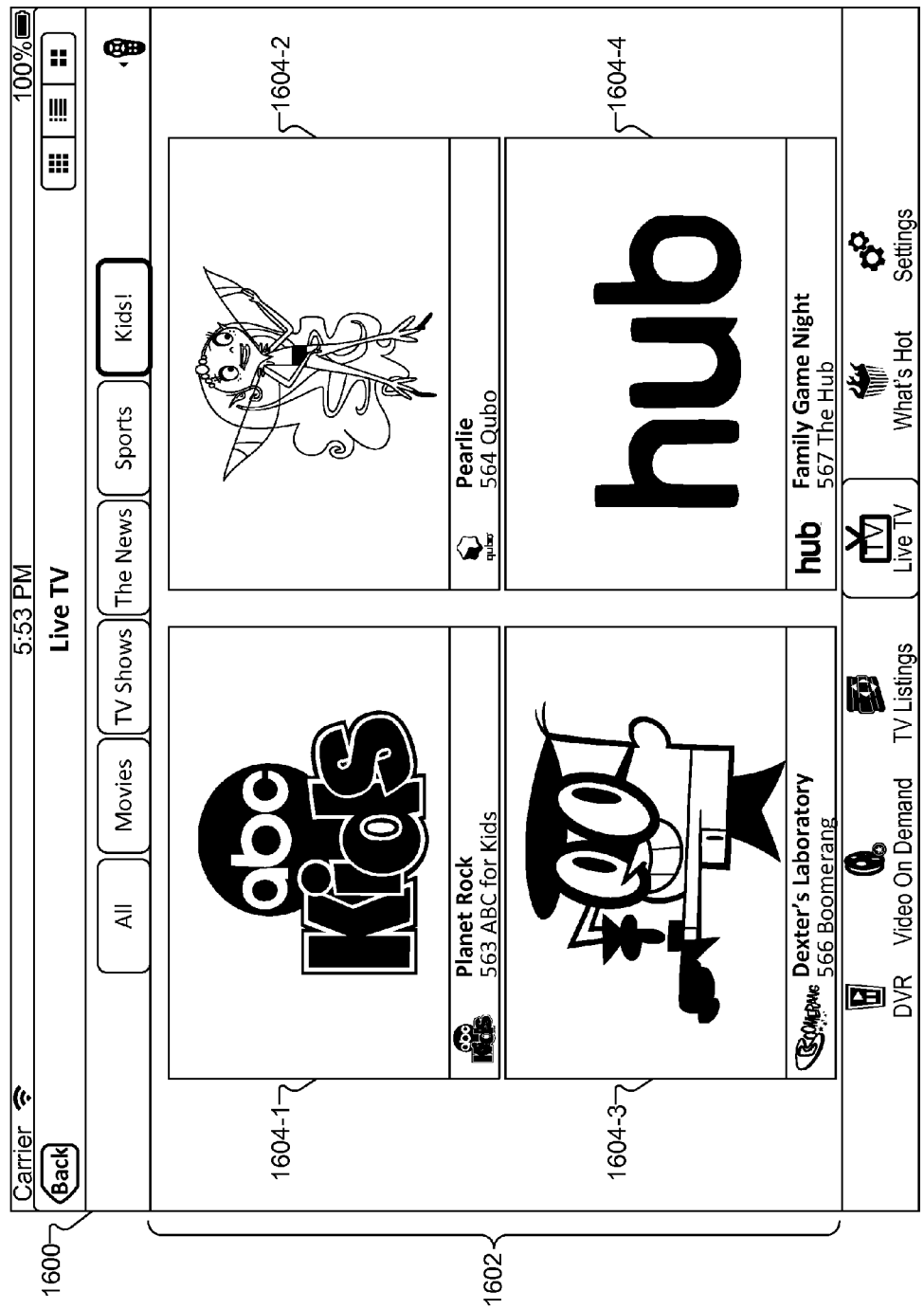
FIGS. 16-18 illustrate exemplary graphical user interface views according to principles described herein.

To illustrate, FIG. 16 illustrates an exemplary GUI view 1600, which may be a view of GUI 1500. As shown, GUI view 1600 may include a menu section 1602 within which menu display areas 1604 (e.g., menu display areas 1604-1, 1604-2, 1604-3, and 1604-4) may be displayed and may represent media content options included in a user-scrollable menu, such as menu 1504.

In the illustrated example, menu display areas 1604 contain media feed logo images displayed therein, and the media feed logo images comprise channel logo images associated with television programming channels known as "ABC for Kids," "Qubo," "Boomerang," and "The Hub." System 100 may be configured to select and use the channel logo images to populate menu display areas 1604, such as described herein. Below each of menu display areas 1604, information associated with the television programming channels is also displayed, which information may include channel logos, names and numbers for the television programming channels, and titles of the television programs currently associated with the television programming channels.

During a display of any of GUI view 1600, a user of a computing device that provides GUI view 1600 for display may provide user input to scroll a menu within menu section 1602, such as described herein. In response to the user input, system 100 may scroll the menu, which may include animating a scroll movement of menu display areas within menu section 1602. The scroll movement may include showing one or more of menu display areas 1604 as moving off screen and one or more other menu display areas moving on screen. During scrolling, system 100 may select still images (rather than video playback) for display in the menu display areas of the menu, such as described herein.

Figure 17:
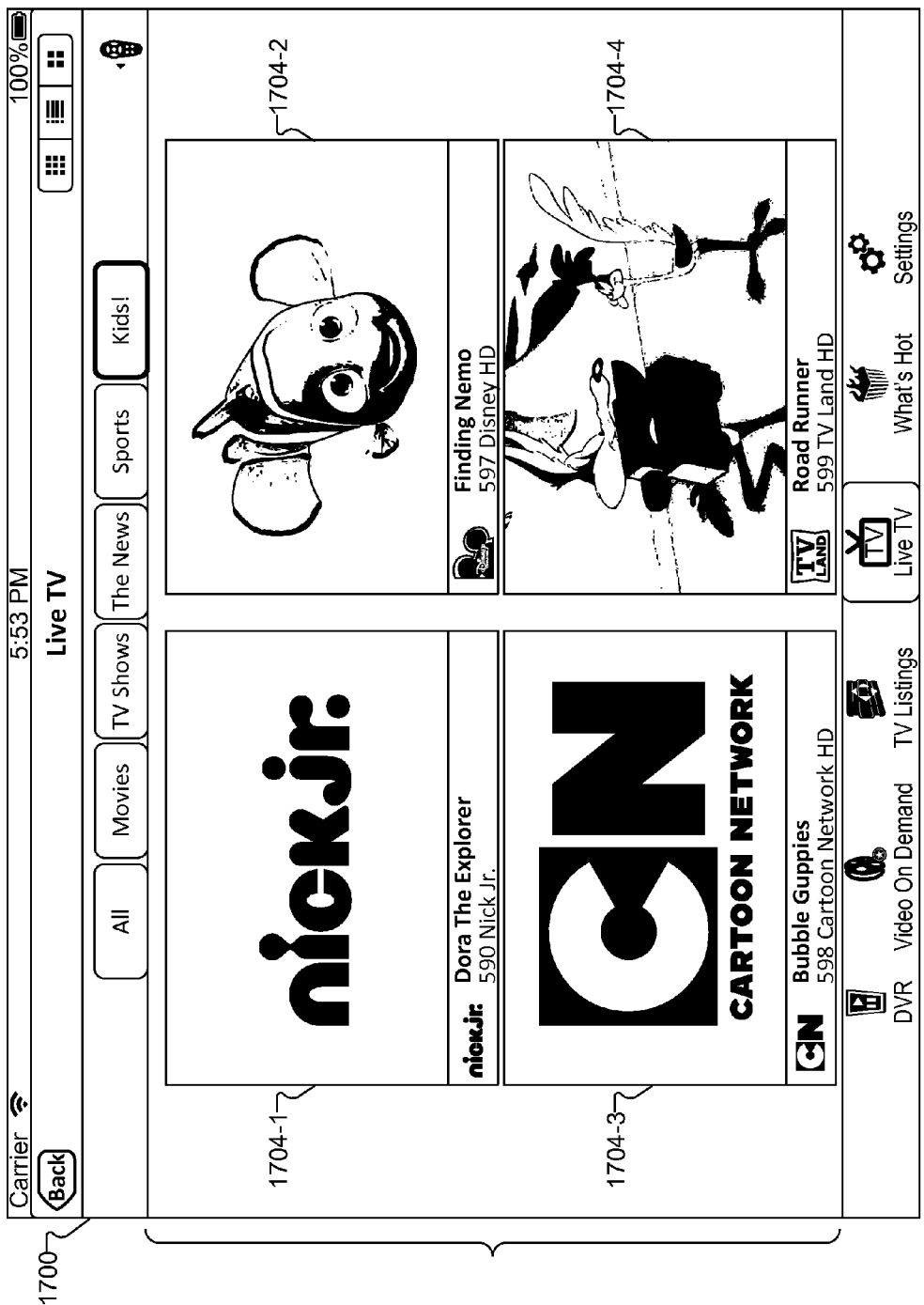

FIG. 17 illustrates an exemplary GUI view 1700. GUI view 1700 may represent a view as displayed after system 100 scrolls a menu within menu section 1602. As shown, menu section 1602 may now include a new set of menu display areas 1702 (e.g., menu display areas 1702-1, 1702-2, 1702-3, and 1702-4) that represent a new set of television programming channels (e.g., television programming channels known as "Nick Jr.," "The Disney Channel HD," "The Cartoon Network HD," and "TV Land HD"). In GUI view 1700, menu display areas 1702 are populated with a combination of channel logo images for the corresponding television programming channels still images of the television programs currently playing on the television programming channels.

Figure 18:
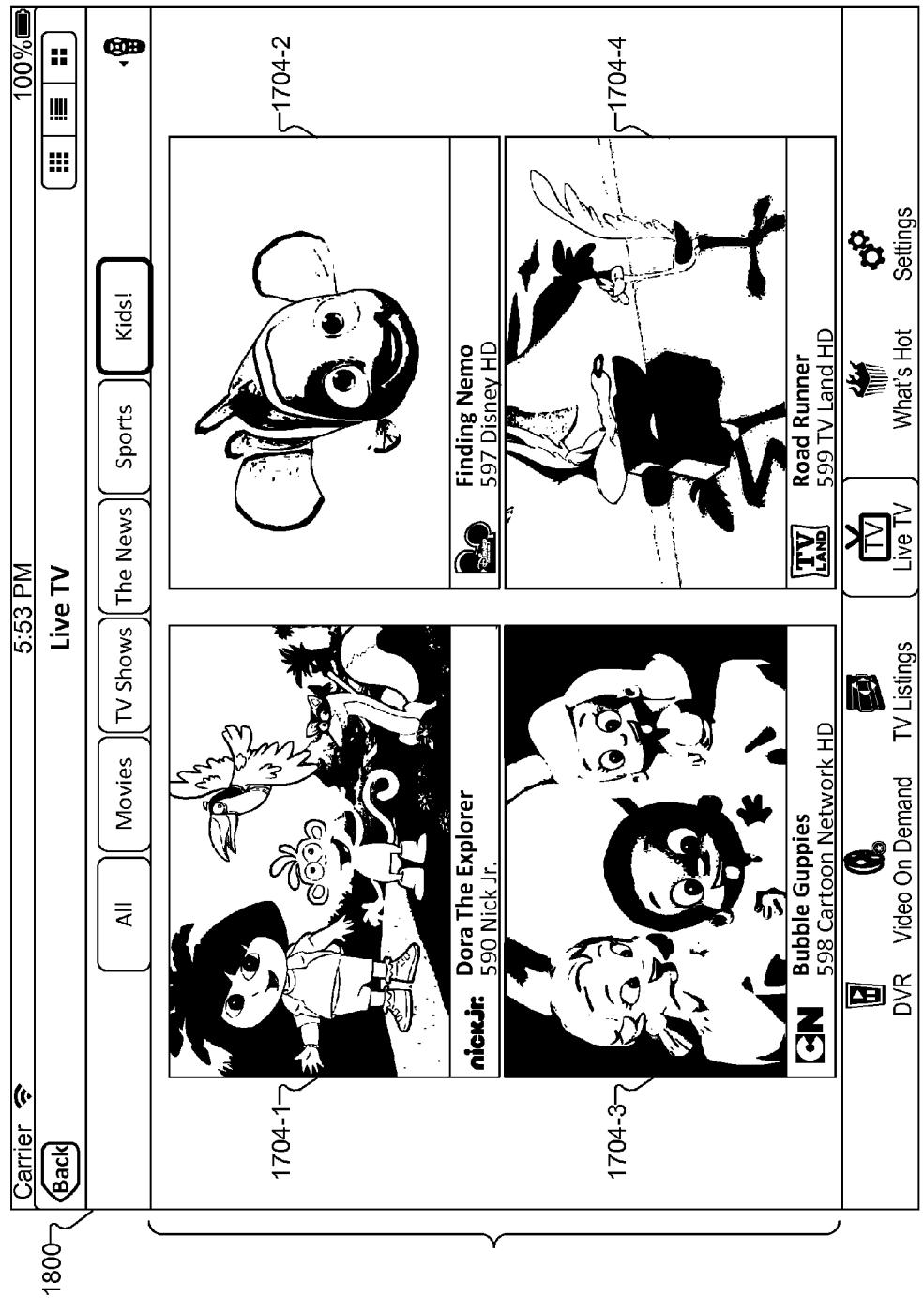

One or more of the still images in menu display areas 1702 may be replaced with video playback of television programs, such as described herein. FIG. 18 illustrates an exemplary GUI view 1800. GUI view 1800 is similar to GUI view 1700 of FIG. 17, except that in GUI view 1800, menu display areas 1702 contain video playback of the television programs associated with television programming channels represented by menu display area 1702. For example, menu display areas 1702-1 and 1702-3 now display playback of video of the television programs known as "Dora The Explorer" and "Bubble Guppies." In other examples, the menu display content in menu display areas 1702-2 and 1702-4 may also be changed to video playback such that all of the menu display areas 1702 include playback of video programs.

In certain examples, multiple video programs may be played back concurrently. In such examples, user interface facility 102 of system 100 may be configured to designate one of the video programs being played back as a primary display video program. For example, the video of the television program titled "Dora The Explorer" may be designated as the primary display video program for GUI view 1800. User interface facility 102 may select the primary display video program in any suitable way, such as by a position of the playback of the video program within a GUI view and/or in response to user selection.

User computing device 602 may be configured to communicate the designation of the primary video program to server subsystem 606, such as in communications related to requesting and receiving a stream carrying the video program from server subsystem 606. User computing device 602 may be further configured to communicate that other video programs being requested and received from server subsystem 606 are not designated as primary video programs.

Server subsystem 606 may be configured to receive the designation information from user computing device 602 and use it to selectively encode and transmit audio for the video programs. For example, server subsystem 606 may be configured to encode a media stream to include a primary video program and the actual audio associated with the primary video program (e.g., video and audio for the "Dora The Explorer" television program). Instead of including the actual audio for a video program that is not designated as the primary video program, server subsystem 606 may encode a media stream for the non-primary video program to include the non-primary video program and a blank audio program (e.g., a blank or silent elementary audio stream). For example, server subsystem 606 may encode a media stream for the "Finding Nemo" television program to include video for the "Finding Nemo" television program and a blank audio program in place of the actual audio program for the "Finding Nemo" television program.

Accordingly, when system 100 concurrently presents video of multiple television programs such as illustrated in FIG. 18, system 100 may concurrently present the audio included in the streams received from server subsystem 606. For example, actual audio for the "Dora the Explorer" television program may be played while blank audio associated with the streams of television programs titled "Finding Nemo," "Bubble Guppies," and "The Road Runner" may be played concurrently with the playing of the "Dora The Explorer" audio content. As a result, user 604 of user computing device 602 will experience the audio content for the primary video program and blank audio for the other video programs such that the audio for the primary video program is not interrupted. This may be especially useful for a user computing device that implements system 100 and runs an operating system that lacks capabilities for silencing audio of video programs when multiple video programs are concurrently presented.

In certain examples, such as in implementation 700 shown in FIG. 7, a user computing device that implements system 100 may be configured to operate as a companion remote control device for consumer electronic devices such as a set-top box device and/or television. In such examples, system 100 may provide user interface elements configured to facilitate user control of one or more operations of a set-top box device, television, and/or other consumer electronics devices. Any of the GUIs and/or GUIs views may provide and/or support these user interface tools.

To illustrate, during display of any of the exemplary GUIs and/or GUI views described herein, a user of user computing device 602 may provide input to cause a media program associated with a media feed 302 to be presented by set-top box device 708 (e.g., displaying video of the media program on a television connected to set-top box device 708). For instance, when GUI view 1800 is displayed, the user may provide input, by way of GUI view 1800, to "flick" the "Dora The Explorer" television program associated with menu display area 1704-1 to set-box device 708, a television, or other consumer electronics device. In response, user computing device 602 may provide one or more control signals to set-top box device 708 to direct set-top box device 708 to perform one or more operations to access the "Nick Jr." television programming channel and present the "Dora The Explorer" television program. In this or a similar manner, a user interface provided by user computing device 602 may be used by a user to find and cause media programs to be presented by set-top box device 708 or by another consumer electronics device communicatively connected to user computing device 602. Any suitable form of user input may be provided to user computing device 602 to initiate such operations.

Figure 19:
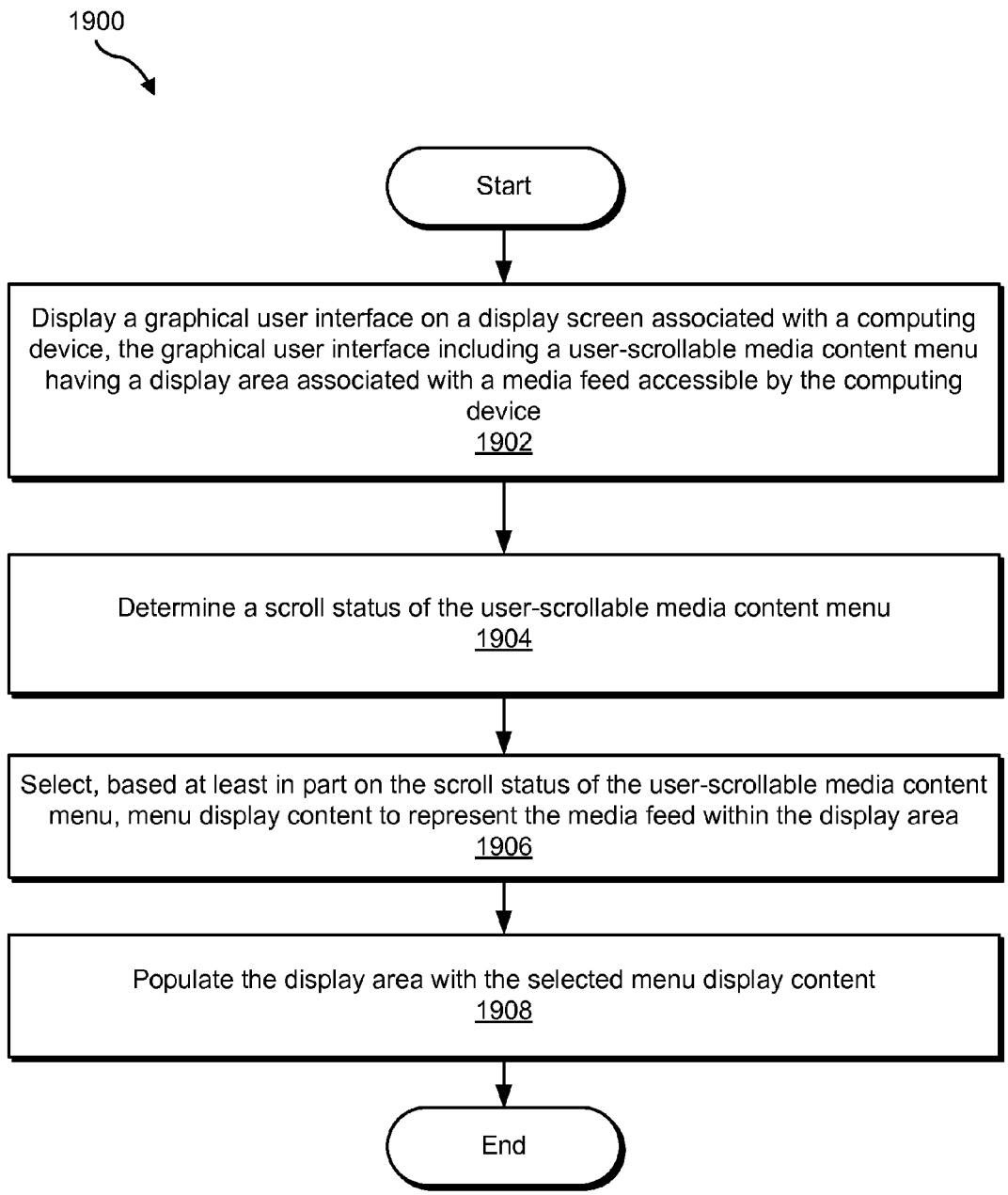
FIGS. 19-20 illustrate exemplary methods of detecting and preventing unintended dialing by a phone device according to principles described herein.
Figure 20:
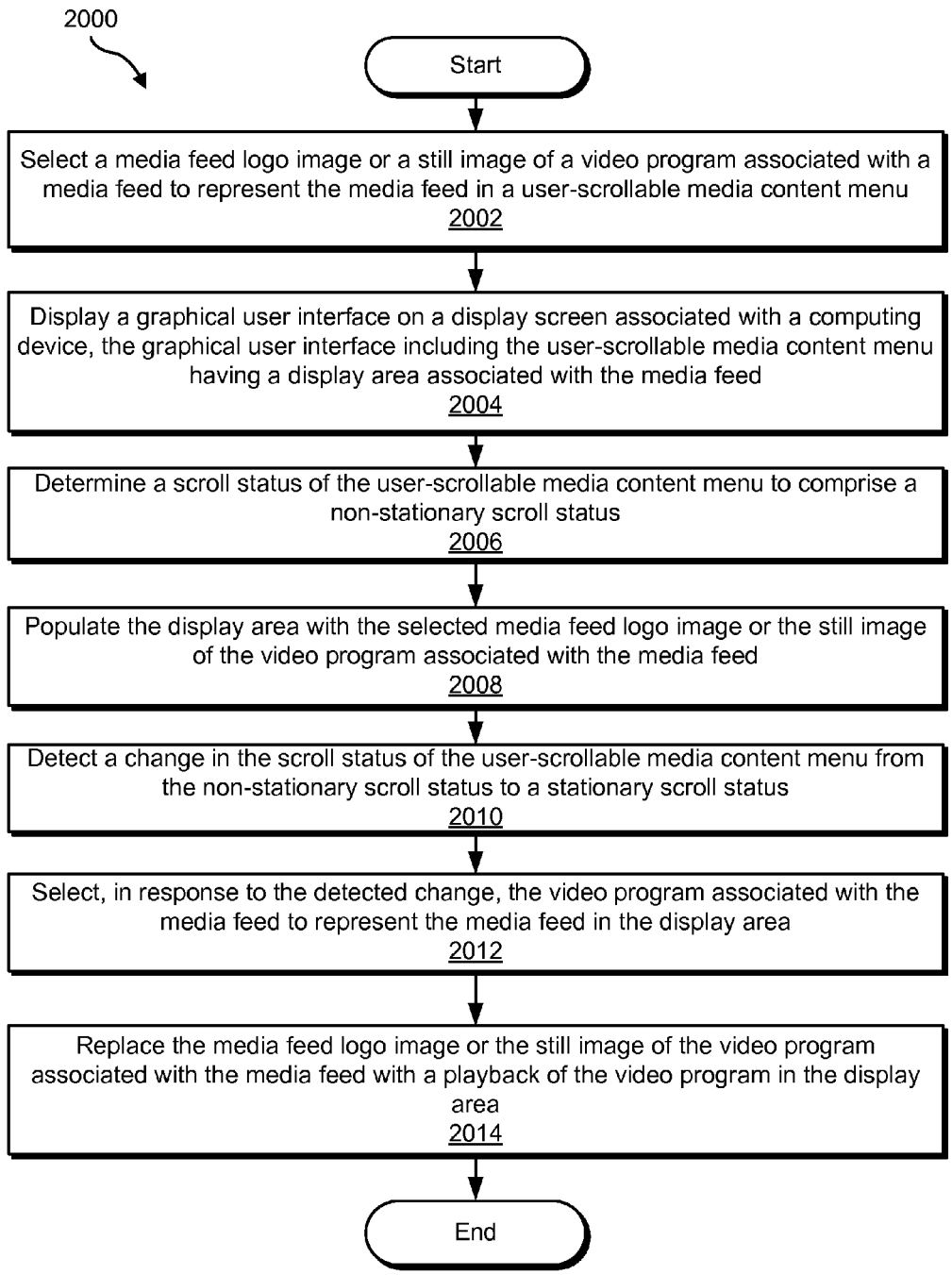

FIGS. 19-20 illustrate exemplary media player user interface methods (i.e., methods 1900 and 2000). While FIGS. 19-20 illustrate exemplary steps according to certain embodiments, other embodiments may omit, add to, reorder, combine, and/or modify any of the steps shown in FIGS. 19-20. One or more of the steps shown in certain methods illustrated in FIGS. 19-20 may be combined with and/or performed in conjunction with (e.g., performed before or after) one or more steps of one or more other methods illustrated in FIGS. 19-20. The methods illustrated in FIGS. 19-20 may be performed by any component or combination of components of a media player user interface system (e.g., system 100), and/or one or more implementations of the media player user interface system (e.g., devices such as user computing device 602 and/or server subsystem 606 implementing system 100).

One or more of the steps of the methods illustrated in FIGS. 19-20 may be repeated. For example, one or more steps may be repeated when monitoring a scroll status of a menu over time, to perform one or more operations when the scroll status changes, and/or for additional display areas included in a menu.

Turning to FIG. 19, in step 1902, a media player user interface system ("system") displays a GUI on a display screen associated with a computing device. The GUI may include a user-scrollable media content menu having a display area associated with a media feed accessible by the computing device. Step 1902 may be performed in any of the ways described herein.

In step 1904, the system determines a scroll status of the user-scrollable media content menu, such as described herein.

In step 1906, the system selects, based at least in part on the scroll status of the user-scrollable media content menu, menu display content to represent the media feed within the display area. Step 1906 may be performed in any of the ways described herein. The selecting in step 1906 may include the system associating the selected menu display content with the menu display area and/or the media feed in any suitable way. In some examples, the association may be made proactively in advance of a display of the GUI, a scroll operation, and/or a need for the menu display content. In other examples, the association may be made in response to a display of the GUI, a scroll operation, a change in scroll status, or a need for the menu display content.

In step 1908, the system populates the display area with the selected menu display content. Step 1908 may be performed in any of the ways described herein.

Turning to FIG. 20, in step 2002, a media player user interface system ("system") selects a media feed logo image or a still image of a video program associated with a media feed to represent the media feed in a user-scrollable media content menu. Step 2002 may be performed into the ways described herein.

In step 2004, the system displays a GUI on a display screen associated with a computing device. The GUI may include the user-scrollable media content menu and may include a display area associated with the media feed. Step 2004 may be performed in any of the ways described herein.

In step 2006, the system determines a scroll status of the user-scrollable media content menu to comprise a non-stationary scroll status, such as described herein.

In step 2008, the system populates the display area with the selected media feed logo image or the still image of the video program associated with the media feed, such as described herein.

In step 2010, the system detects a change in the scroll status of the user-scrollable media content menu from the non-stationary scroll status to a stationary scroll status, such as described herein.

In step 2012, the system selects, in response to the detected change, the video program associated with the media feed to represent the media feed in the display area, such as described herein.

In step 2014, the system replaces the media feed logo image or the still image of the video program associated with the media feed with a playback of the video program in the display area, such as described herein.

One of more steps of method 2000 may be repeated, or similar steps performed by the system for a change in scroll status from a stationary to a non-stationary scroll status.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 21:
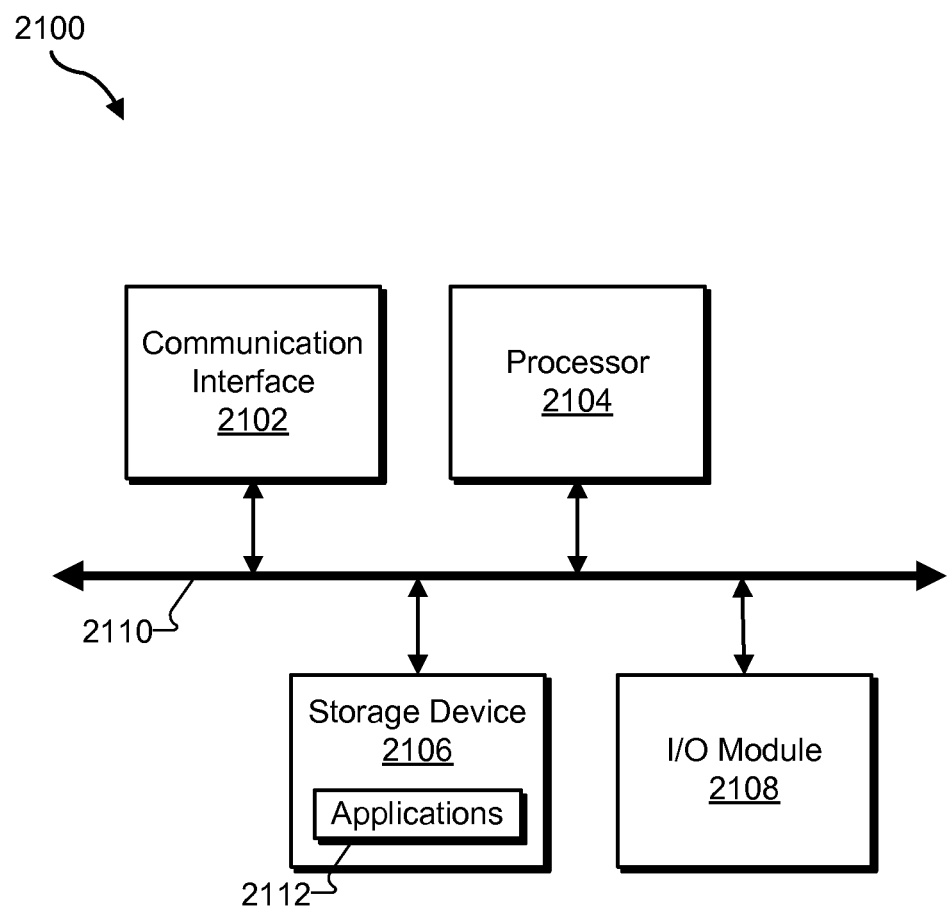
FIG. 21 illustrates an exemplary computing device according to principles described herein.

FIG. 21 illustrates an exemplary computing device 2100 that may be configured to perform one or more of the processes described herein. As shown in FIG. 21, computing device 2100 may include a communication interface 2102, a processor 2104, a storage device 2106, and an input/output ("I/O") module 2108 communicatively connected via a communication infrastructure 2110. While an exemplary computing device 2100 is shown in FIG. 21, the components illustrated in FIG. 21 are not intended to be limiting. Additional or alternative components may be used in other embodiments. Components of computing device 2100 shown in FIG. 21 will now be described in additional detail.

Communication interface 2102 may be configured to communicate with one or more computing devices. Examples of communication interface 2102 include, without limitation, a wired network interface (such as a network interface card), a wireless network interface (such as a wireless network interface card), a modem, an audio/video connection, and any other suitable interface.

Processor 2104 generally represents any type or form of processing unit capable of processing data or interpreting, executing, and/or directing execution of one or more of the instructions, processes, and/or operations described herein. Processor 2104 may execute and/or direct execution of operations as directed by one or more applications 2112 (which may include one or more software applications 102 included in suite 100) or other computer-executable instructions such as may be stored in storage device 2106 or another computer-readable medium.

Storage device 2106 may include one or more data storage media, devices, or configurations and may employ any type, form, and combination of data storage media and/or device. For example, storage device 2106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2106. For example, data representative of one or more executable applications 2112 configured to direct processor 2104 to perform any of the operations described herein may be stored within storage device 2106. In some examples, data may be arranged in one or more databases residing within storage device 2106.

I/O module 2108 may be configured to receive user input and provide user output and may include any hardware, firmware, software, or combination thereof supportive of input and output capabilities. For example, I/O module 2108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 2108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 2108 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 2100. For example, one or more applications 2112 residing within storage device 2106 may be configured to direct processor 2104 to perform one or more processes or functions associated with user interface 102 and/or media player facility 104. Likewise, storage facility 106 may be implemented by or within storage device 2106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    displaying, by a media player user interface system, a graphical user interface on a display screen associated with a computing device, the graphical user interface including a user-scrollable media content menu that includes a display area associated with a plurality of media feeds accessible by the computing device;

selecting, by the media player user interface system based at least in part on a stationary scroll status of the user-scrollable media content menu, menu display content to represent each of the plurality of media feeds within the display area, the selecting of the menu display content comprising selecting a first video program associated with a first media feed included in the plurality of media feeds and selecting a second video program associated with a second media feed included in the plurality of media feeds;

accessing, by the media player user interface system, the first media feed and the second media feed, the first media feed including the first video program and an audio program associated with the first video program, the second media feed including the second video program and a blank audio program, the blank audio program provided by way of a blank audio stream encoded such that the blank audio program is provided in place of an actual audio program associated with the second video program;

populating, by the media player user interface system, the display area with the selected menu display content, the populating of the display area comprising concurrently playing back the first video program and the second video program in the display area;

playing, by the media player user interface system, the audio program included in the first media feed concurrently with the playing back of the first video program; and playing, by the media player user interface system, the blank audio program included in the second media feed concurrently with the playing back of the second video program.

2. The method of claim 1, wherein the selecting of the menu display content further comprises selecting additional menu display content from a group of display content options for an additional media feed included in the plurality of media feeds, the group of display content options comprising
at least one of a logo image for the additional media feed and a still image of a video program associated with the additional media feed.

3. The method of claim 2, wherein the selecting of the additional display content from the group of display content options comprising the at least one of the logo image for the additional media feed and the still image of the video program associated with the additional media feed comprises:
determining whether the still image of the video program associated with the additional media feed is available;
selecting the still image of the video program associated with the additional media feed when the still image is determined to be available; and
selecting the logo image for the additional media feed when the still image is determined to be unavailable.

4. The method of claim 1, further comprising:
detecting, by the media player user interface system, a change in a scroll status of the user-scrollable media content menu from the stationary scroll status to a non-stationary scroll status;
selecting, by the media player user interface system in response to the detecting of the change in the scroll status, one of a logo image for the first media feed and a still image of the first video program to represent the first media feed within the display area; and replacing, by the media player user interface system, the playback of the first video program in the display area with the selected one of the logo image for the first media feed and the still image of the first video program included in the first media feed.

5. The method of claim 1, wherein the plurality of media feeds comprise streaming live television content associated with a plurality of television programming channels of a subscription television service.

6. The method of claim 1, wherein:
the user-scrollable media content menu further includes an additional display area associated with an additional media feed included in the plurality of media feeds accessible by the computing device; and
the method further comprises:
selecting, by the media player user interface system based at least in part on the stationary scroll status of the user-scrollable media content menu, additional menu display content to represent the additional media feed in the additional display area; and
populating, by the media player user interface system, the additional display area with the selected additional menu display content.

7. The method of claim 1, embodied as computer-executable instructions on at least one non-transitory computer-readable medium.

8. A system comprising:
a handheld computing device having an integrated display screen; and
a software application installed on the handheld computing device and that directs the handheld computing device to
display, on the integrated display screen, a graphical user interface that includes a user-scrollable media content menu having a display area associated with a plurality of media feeds accessible by the handheld computing device;
select, based at least in part on a stationary scroll status of the user-scrollable media content menu, menu display content to represent each of the plurality of media feeds within the display area, the selecting of the menu display content comprising selecting a first video program associated with a first media feed included in the plurality of media feeds and selecting a second video program associated with a second media feed included in the plurality of media feeds,
access the first media feed and the second media feed, the first media feed including the first video program and an audio program associated with the first video program, the second media feed including the second video program and a blank audio program, the blank audio program provided by way of a blank audio stream encoded such that the blank audio program is provided in place of an actual audio program associated with the second video program, and
populate the display area with the selected menu display content by
playing back the first video program and the second video program in the display area;
playing the audio program included in the first media feed concurrently with the playing back of the first video program; and
playing the blank audio program included in the second media feed concurrently with the playing back of the second video program.

9. The system of claim 8, wherein the software application directs the handheld computing device to select the menu display content by selecting additional menu display content from a group of display content options for an additional media feed included in the plurality of media feeds, the group of display content options comprising
at least one of a logo image for the additional media feed and a still image of a video program associated with the additional media feed.

10. The system of claim 9, wherein the selecting of the additional display content from the group of display content options comprising the at least one of the logo image for the additional media feed and the still image of the video program associated with the additional media feed comprises:
determining whether the still image of the video program associated with the additional media feed is available;
selecting the still image of the video program associated with the additional media feed when the still image is determined to be available; and
selecting the logo image for the additional media feed when the still image is determined to be unavailable.

11. The system of claim 8, wherein the software application further directs the handheld computing device to:
detect a change in a scroll status of the user-scrollable media content menu from the stationary scroll status to a non-stationary scroll status;
select, in response to the detecting of the change in the scroll status, one of a logo image for the first media feed and a still image of the first video program to represent the first media feed within the display area; and
replace the playback of the first video program in the display area with the selected one of the logo image for the first media feed and the still image of the first video program included in the first media feed.

12. The system of claim 8, wherein the plurality of media feeds comprise streaming live television content associated with a plurality of television programming channels of a subscription television service.

13. The system of claim 8, wherein:
the user-scrollable media content menu further includes an additional display area associated with an additional media feed included in the plurality of media feeds accessible by the computing device; and
the software application further directs the handheld computing device to:
select, based at least in part on the stationary scroll status of the user-scrollable media content menu, additional menu display content to represent the additional media feed in the additional display area; and
populate the additional display area with the selected additional menu display content.

14. An apparatus comprising:
a display screen;
memory;
a processor communicatively coupled to the display screen and the memory; and
a software application installed in the memory and that directs the processor to:
display, on the integrated display screen, a graphical user interface that includes a user-scrollable media content menu having a display area associated with a plurality of media feeds accessible by the handheld computing device;
select, based at least in part on a stationary scroll status of the user-scrollable media content menu, menu display content to represent each of the plurality of media feeds within the display area, the selecting of the menu display content comprising selecting a first video program associated with a first media feed included in the plurality of media feeds and selecting a second video program associated with a second media feed included in the plurality of media feeds;
access the first media feed and the second media feed, the first media feed including the first video program and an audio program associated with the first video program, the second media feed including the second video program and a blank audio program, the blank audio program provided by way of a blank audio stream encoded such that the blank audio program is provided in place of an actual audio program associated with the second video program; and
populate the display area with the selected menu display content by
playing back the first video program and the second video program in the display area,
playing the audio program included in the first media feed concurrently with the playing back of the first video program, and
playing the blank audio program included in the second media feed concurrently with the playing back of the second video program.

15. A non-transitory computer-readable medium comprising computer-executable instructions configured to direct a computing device to:
display a graphical user interface on a display screen associated with the computing device, the graphical user interface including a user-scrollable media content menu that includes a display area associated with a plurality of media feeds accessible by the computing device;
select, based at least in part on a stationary scroll status of the user-scrollable media content menu, menu display content to represent each of the plurality of media feeds within the display area, the selecting of the menu display content comprising selecting a first video program associated with a first media feed included in the plurality of media feeds and selecting a second video program associated with a second media feed included in the plurality of media feeds;
access the first media feed and the second media feed, the first media feed including the first video program and an audio program associated with the first video program, the second media feed including the second video program and a blank audio program, the blank audio program provided by way of a blank audio stream encoded such that the blank audio program is provided in place of an actual audio program associated with the second video program;
populate the display area with the selected menu display content by concurrently playing back the first video program and the second video program in the display area;
play the audio program included in the first media feed concurrently with the playing back of the first video program; and
play the blank audio program included in the second media feed concurrently with the playing back of the second video program.

* * * * *